United States Patent [19]

Suzuki et al.

[11] Patent Number: 4,890,378
[45] Date of Patent: Jan. 2, 1990

[54] METHOD FOR MANUFACTURING A MAGNETIC HEAD CORE HAVING A MAGNETIC FILM

[75] Inventors: Takashi Suzuki, Yokohama; Toshio Yamanaka, Kawasaki; Hiroyuki Suzuki, Yokohama; Tsuyoshi Orikasa, Kasukabe; Takeshi Sawada, Yamato; Makoto Kameyama, Urayasu; Kiyozumi Niizuma, Ohmiya, all of Japan

[73] Assignee: Canon Kabushiki Kaisha, Tokyo, Japan

[21] Appl. No.: 235,824

[22] Filed: Aug. 19, 1988

Related U.S. Application Data

[63] Continuation of Ser. No. 900,881, Aug. 27, 1986, abandoned.

[30] Foreign Application Priority Data

| Aug. 28, 1985 | [JP] | Japan | 60-187486 |
| May 16, 1986 | [JP] | Japan | 61-112061 |
| Jun. 6, 1986 | [JP] | Japan | 61-131435 |
| Jul. 25, 1986 | [JP] | Japan | 61-174976 |
| Jul. 25, 1986 | [JP] | Japan | 61-174977 |
| Jul. 25, 1986 | [JP] | Japan | 61-174978 |
| Jul. 25, 1986 | [JP] | Japan | 61-194979 |

[51] Int. Cl.⁴ ............................................. G11B 5/42
[52] U.S. Cl. .................................... 29/603; 360/119; 360/126; 360/127

[58] Field of Search ................... 29/603; 760/119–121, 760/126, 127

[56] References Cited

U.S. PATENT DOCUMENTS

| 4,182,643 | 1/1980 | Calderon, Jr. et al. | 29/603 X |
| 4,670,807 | 6/1987 | Gorter et al. | 360/125 |

FOREIGN PATENT DOCUMENTS

| 58-17522 | 2/1983 | Japan | 360/120 |
| 58-175122 | 10/1983 | Japan | 360/127 |

Primary Examiner—Carl E. Hall
Attorney, Agent, or Firm—Fitzpatrick, Cella, Harper & Scinto

[57] ABSTRACT

A magnetic head in which a first magnetic film made of a material of high saturation magnetic flux density is deposited on the surface of a block made of a high permeability material and which contains a groove for winding. A nonmagnetic film made of a nonmagnetic material and serving as a magnetic gap is formed on the first magnetic film; and a second magnetic film made of a material of high saturation magnetic flux density is further formed on the nonmagnetic film. A reinforcing block is arranged on the second magnetic film and has a nonmagnetic material portion exposed to a slide surface of a recording medium. The high permeability material block, the first magnetic film and the second magnetic film together constitute a magnetic core, and the second magnetic film is bonded with the reinforcing block.

17 Claims, 40 Drawing Sheets

FIG. 9
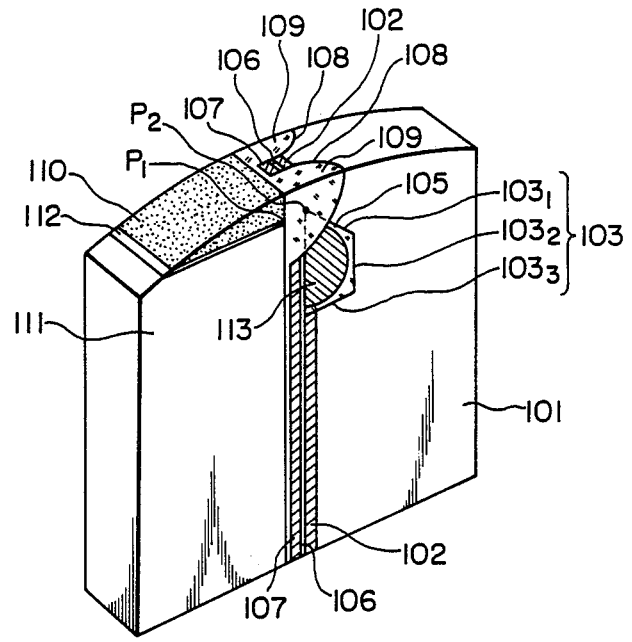
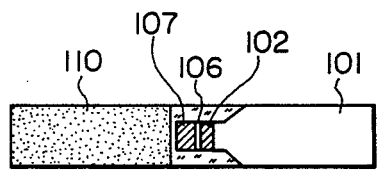
FIG. 11A
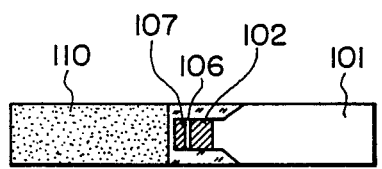
FIG. 11B
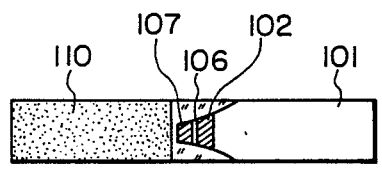
FIG. 11C

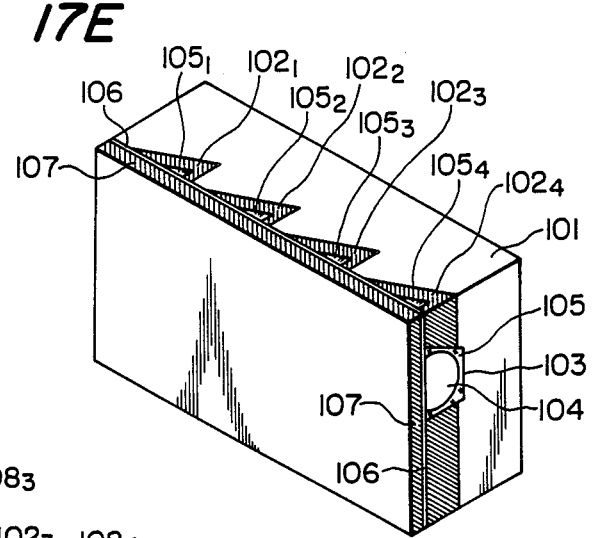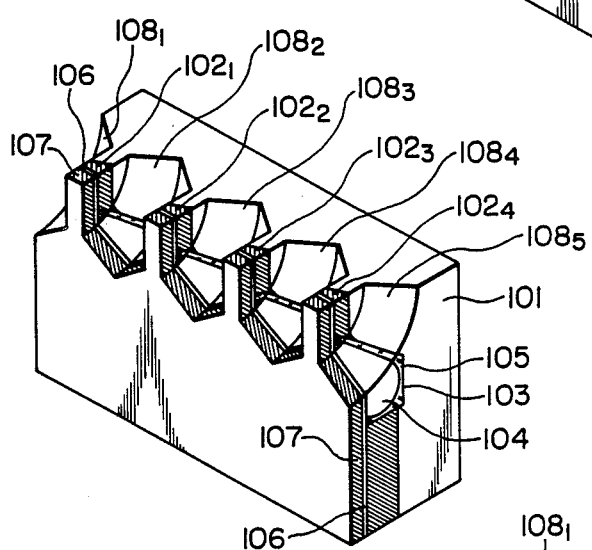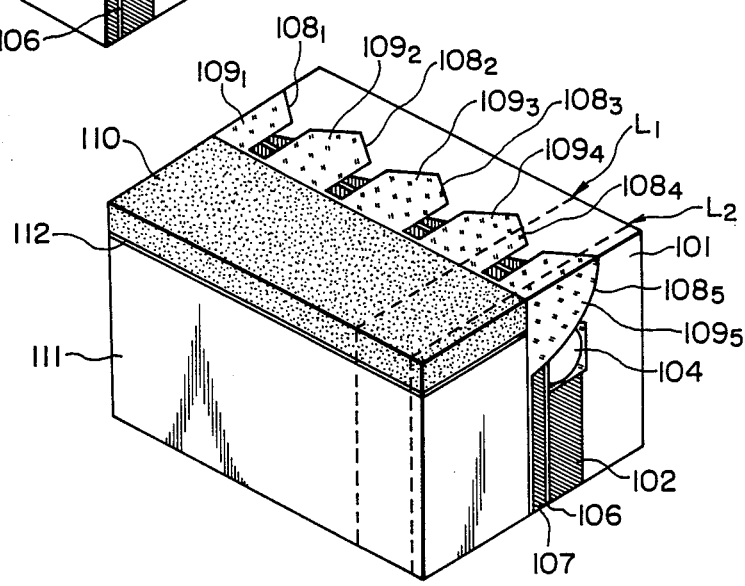

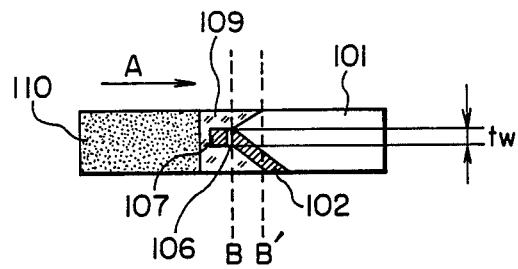
FIG. 34A
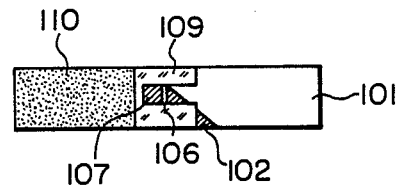
FIG. 34B
FIG. 35
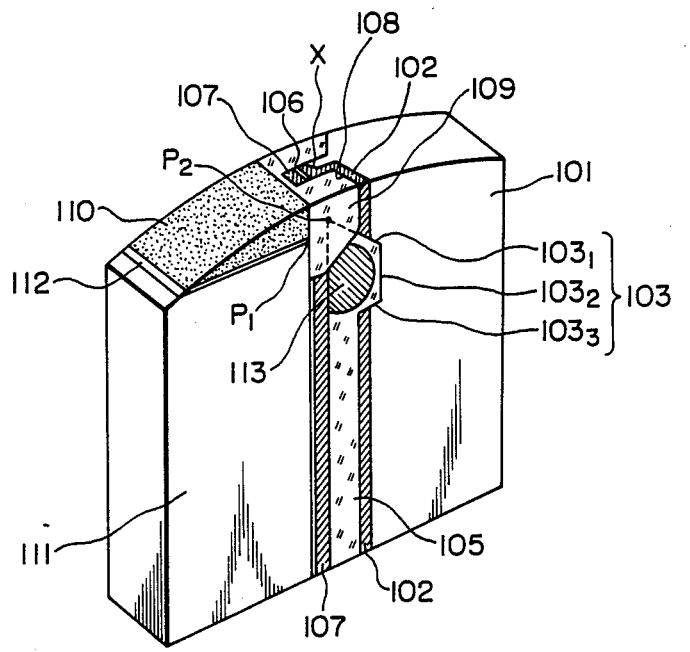

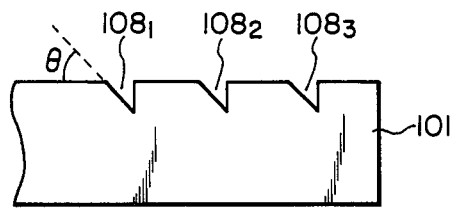
FIG. 36A
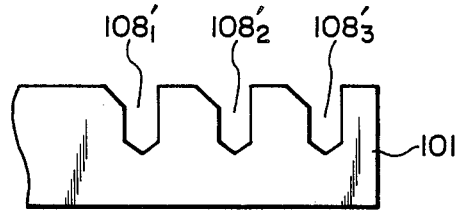
FIG. 36B
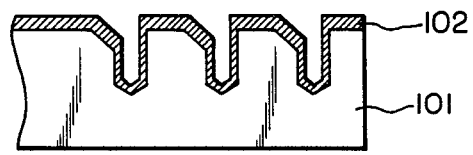
FIG. 36C
FIG. 36D
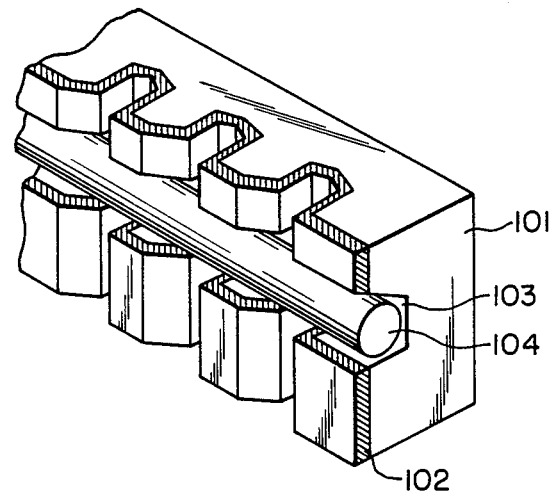

METHOD FOR MANUFACTURING A MAGNETIC HEAD CORE HAVING A MAGNETIC FILM

This application is a continuation of application Ser. No. 900,881 filed Aug. 27, 1986, now abandoned.

BACKGROUND OF THE INVENTION

1. Field of the Invention

The present invention relates to a magnetic head and, more particularly, to a magnetic head having a magnetic core in which a magnetic film made of a material having a high saturation magnetic flux density is formed on a block made of a material of high permeability.

2. Related Background Art

In VTR (video tape recorders) using a magnetic tape of a width of 8 mm as a recording medium and electrophotographic cameras which have recently been developed, a medium having a high coercive force Hc of 1300 to 1500 Oe such as the so-called metal powder medium or the like is used as a recording medium.

Therefore, in the conventional magnetic head using only a ferrite system material as a magnetic core material, the saturation magnetic flux density Bs of the magnetic core is at most about 5000 gauss. Thus, if a material having a high coercive force is used for the medium saturation of the magnetic core will occur, reducing the recording efficiency.

To prevent this, a magnetic head in which a magnetic alloy such as Sendust, amorphous, or the like having a high saturation magnetic flux density is used as a magnetic core material. However, in the case of manufacturing the magnetic core of such a head, it is a fundamental technique to form the magnetic core by joining the chip-like core half bodies through the magnetic gap so as to face each other. Therefore, in this case, several problems arise such that the mass productivity is low and a variation in characteristics is large, so that the manufacturing costs remarkably increase as compared with the method such as in the ferrite cores whereby after abutting blocks, they are sliced to obtain a number of cores.

To solve the problem of the mass productivity, there have been proposed various kinds of what are called composite type magnetic cores in which the foregoing magnetic alloy material is used for the abutting surface portions which sandwich the magnetic gap between the core half bodies and ferrite is used for the remaining portions.

The magnetic head having such a structure is called MIG (Metal In Gap) head and has already been put into practical use.

The MIG head has the structure such that almost all of the core portion is made of a material of high permeability such as ferrite or the like and the magnetic pole edge portion near the gap is made of a material of high saturation magnetic flux density, namely, as alloy magnetic material such as permalloy, Sendust, amorphous, or the like. The MIG head includes two types: the type in which the boundary between the metal magnetic material and the ferrite on the slide surface is parallel with the operating gap (this type is called P type; for example, the P type is disclosed in the Official Gazette of Japanese Patent Unexamined Publication No. 140708/1976, and the like); and the type in which the boundary is not parallel with the operating gap but has an azimuth (this type is called A type; for example, the A type is disclosed in the Official Gazettes of Japanese Patent Unexamined Publication Nos. 96013/1979, 32107/1985, and the like). The MIG head of the A type has already been put into practical use. This is because according to the MIG head of the P type, the boundary between the metal magnetic material and the ferrite functions as a pseudo gap and a ripple voltage of about a few dB as the peak-to-peak value appears in the frequency to output characteristic by the contour effect due to the function of the pseudo gap.

However, in the foregoing MIG head, the operating magnetic gap is formed by the so-called abutting process. In heads in which the operating gap is formed by the conventional abutting process, the gap width varies greatly, resulting in greater variations in the characteristics of the heads.

In particular, in the case of the core for use in the 8-millimeter VTR, the track width is extremely narrow (about 15 μm) and the gap width is very narrow (about 0.25 μm). Therefore, in the abutting process, extremely high degrees of accuracy are needed to accurately position the tracks and to form the gap, and fairly large variations in dimensions of the track and gap occur. Even if a desired gap width assumes, for example, 0.25 μm, it will vary within a range of about 0.2 to 0.3 μm.

This results in a deterioration of the yield.

To solve this problem, a method of manufacturing the magnetic core in which the abutting process is eliminated has been proposed. FIGS. 1A to 1D are diagrams for explaining an example (Japanese Patent Unexamined Publication No. 73913/1980) of the manufacturing method.

First, a through hole 2 to wind a winding is formed in a core base plate 1 as shown in FIG. 1A. A core half body 3 consisting of a film of Sendust alloy or the like is formed on the core base plate 1 by a sputtering method or the like as shown in FIG. 1B. A nonmagnetic gap material 4 such as $SiO_2$ or the like of a predetermined thickness is deposited on the surface of the core base plate 1 where a magnetic gap will be formed. Next, after a ferromagnetic material such as Sendust alloy or the like is deposited on the core base plate 1 by the sputtering method or the like as indicated by an arrow A in FIG. 1B, the magnetic material deposited on the unnecessary portions is removed and the film of the remaining magnetic material as shown in FIG. 1C is used as a second core half body 5, so that a magnetic core as shown in FIG. 1C is derived.

Although the magnetic core manufactured by this method doesn't have the foregoing problem due to the abutting process, another problem occurs.

Namely, the through hole 2 needs to be formed in the core base plate 1. On the other hand, in the case of forming the azimuth in the magnetic gap, a fixed azimuth angle $\theta$ must be formed by the gap forming surface B of the core half body 3 as shown in FIG. 1B. Further, when the magnetic material film of the second half body 5 is formed, as shown in a cross sectional view of FIG. 1D, if a film is formed on the surface having a stairway portion, the characteristic of the magnetic material will deteriorate near the edge portions C and D where the surfaces cross with each other.

According to this manufacturing method, it is extremely difficult to cheaply manufacture the cores without encountering those problems.

The applicant of the present invention has already proposed the manufacturing method whereby the abutting process is omitted and the mass productivity can be further improved in consideration of the above point.

FIGS. 2A to 2H are diagrams for explaining this manufacturing method.

First, a block 6 made of a magnetic alloy material of high saturation magnetic flux density such as Sendust or the like as shown in FIG. 2A is prepared. A winding window 7 is then formed into the block 6 by digging, grinding, or the like as shown in FIG. 2B.

Next, as shown in FIG. 2C, the winding window 7 is embedded with a cover material 8 such as aluminum, silver solder, or the like. Further, a nonmagnetic material of $SiO_2$ having a predetermined thickness is deposited as a magnetic gap 9 onto the magnetic gap forming surface of the block 6 by the sputtering method or the like.

Next, as shown in FIG. 2D, a magnetic material film 10 such as Sendust or the like is deposited as a core by the sputtering method or the like so that the magnetic gap 9 is sandwiched by the film 10 and the block 6.

Subsequently, as shown in FIG. 2E, the cover material 8 is dissolved again exposing the winding window 7.

Further, as indicated by an alternate long and short dash line in FIG. 2F, the resultant whole assembly is cut at the azimuth angle $\theta$.

FIG. 2G shows a state in which a reinforcing plate 11 of a nonmagnetic material is adhered onto the cut surface by an adhesive agent 12. The resultant assembly is further cut along an alternate long and short dash line shown in FIG. 2G.

A reinforcing plate 14 of a nonmagnetic material is also adhered onto the cut surface by an adhesive agent 13 as shown in FIG. 2H, thereby obtaining a magnetic core.

Although the mass productivity is remarkably improved according to the manufacturing method shown in FIGS. 2A to 2H as compared with that by the manufacturing method in FIGS. 1A to 1D, the former method still has the following problems.

First, as shown in FIG. 2H, two reinforcing plates 11 and 14 need to be adhered with respect to one magnetic core. In addition, the thickness of the magnetic material film 10 (in the sliding direction of the medium) needs to be set to about 0.5 mm, which is equal to the dimension from the medium slide surface to the upper end of the winding window 7 in terms of the characteristic of the core. However, it takes tens of hours to form the film of a thickness of about 0.5 mm by the physical evaporation deposition such as the sputtering method or the like, thereby reducing productivity. If the film thickness is set to a small value, on the contrary, the resistance of the magnetic circuit will increase and the output will decrease.

SUMMARY OF THE INVENTION

It is an object of the present invention to provide a magnetic head which can solve the foregoing problems.

Another object of the invention is to provide a magnetic head in which the gap width and track width can be accurately specified and which can be manufactured in a short time and can cope with a magnetic recording medium having a high coercive force.

Under such objects, as one of embodiments according to the present invention, there is provided a magnetic head comprising:

(a) a magnetic block made o a material of high permeability in which a groove for a winding is formed in one surface of this block;

(b) a first magnetic film made having a material of high saturation magnetic flux density which is deposited at least on the side of a slide surface of a recording medium than the groove on the surface of the magnetic block where the groove is formed;

(c) a nonmagnetic film made of a nonmagnetic material which is deposited on the first magnetic film and serves as a magnetic gap; and (d) a second magnetic film made of a material of high saturation magnetic flux density which is deposited on the nonmagnetic film.

Still another object of the invention is to provide a magnetic head which can prevent the boundary of two kinds of magnetic materials functioning as a pseudo gap.

Under such an object, as one of embodiments according to the invention, there is provided a magnetic head comprising:

(a) a magnetic block made of a first magnetic material;

(b) a first magnetic film which is made of a second magnetic material different from the first magnetic material and which is deposited on the magnetic block in a predetermined direction;

(c) a nonmagnetic film made of a nonmagnetic material which is deposited on the first magnetic film and serves as a magnetic gap, in which the boundary between the magnetic block and the first magnetic film doesn't have any portion which is parallel with the boundary between the first magnetic film and the nonmagnetic film (i.e., the boundaries are oblique); and (d) a second magnetic film which is deposited on the nonmagnetic film.

Still another object of the invention is to provide a magnetic head which has the stable characteristic for a time-dependent change and in which accumulation of internal stresses upon manufacturing due to the existence of two kinds of magnetic materials doesn't occur.

Under such an object, as one of embodiments according to the invention, there is provided a magnetic head comprising:

(a) a magnetic block made of a first magnetic material in which a groove for a winding is formed in one surface of this block;

(b) a first magnetic film which is made of a second magnetic material different from the first magnetic material and which is deposited on the portion excluding the inside of the groove of the surface of the magnetic block where the groove is formed;

(c) a nonmagnetic film made of a nonmagnetic material which is deposited on the first magnetic film and serves as a magnetic gap; and (d) a second magnetic film which is deposited on the nonmagnetic film.

The above and other objects and features of the present invention will become apparent from the following detailed description and the appended claims with reference to the accompanying drawings.

BRIEF DESCRIPTION OF THE DRAWINGS

FIG. 9 is a diagram showing a structure of a magnetic head is another embodiment of the invention;

FIGS. 11A to 11C are diagrams showing constitutions on the medium slide surfaces of magnetic heads of other embodiments similar to the magnetic head of FIG. 9;

FIGS. 17A to 17G are diagrams showing a manufacturing process of the magnetic head of FIG. 16;

FIGS. 34A and 34B are diagrams for explaining the problem which is caused due to the deterioration in working accuracy;

FIG. 35 is a diagram showing a structure of a magnetic head as further another embodiment of the invention;

FIGS. 36A to 36H the diagrams showing a manufacturing process of the magnetic head of FIG. 35;

DETAILED DESCRIPTION OF PREFERRED EMBODIMENTS

Figure 1A:
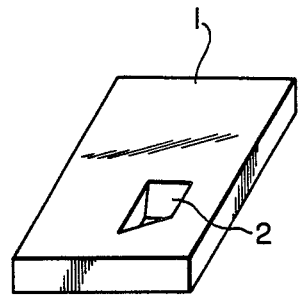
FIGS. 1A to 1D are diagrams showing a manufacturing process of a conventional magnetic head.
Figure 1B:
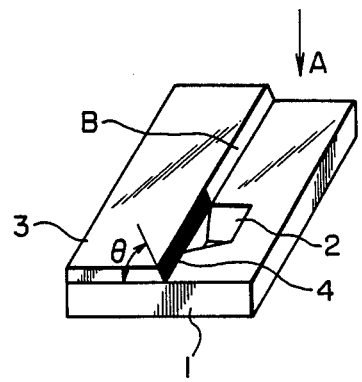
Figure 1C:
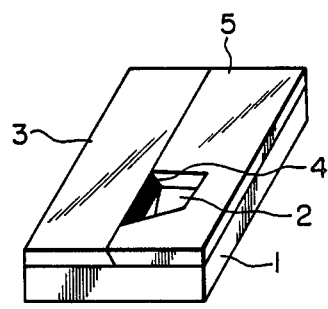
Figure 1D:
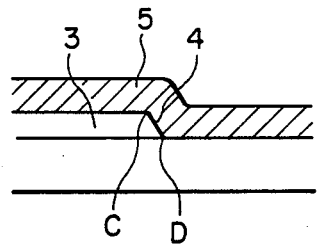
Figure 2A:
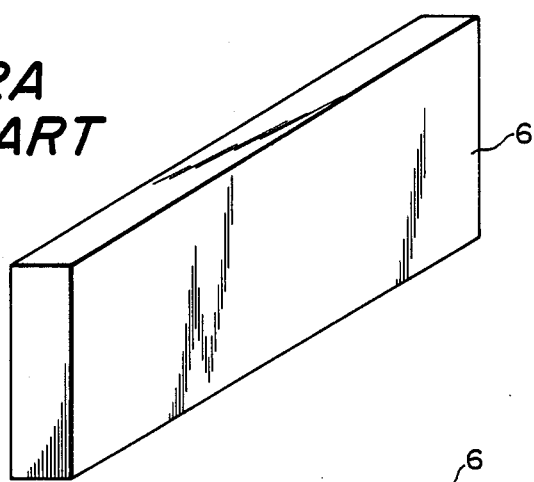
FIGS. 2A to 2H are diagrams showing a manufacturing process of another conventional magnetic head.
Figure 2B:
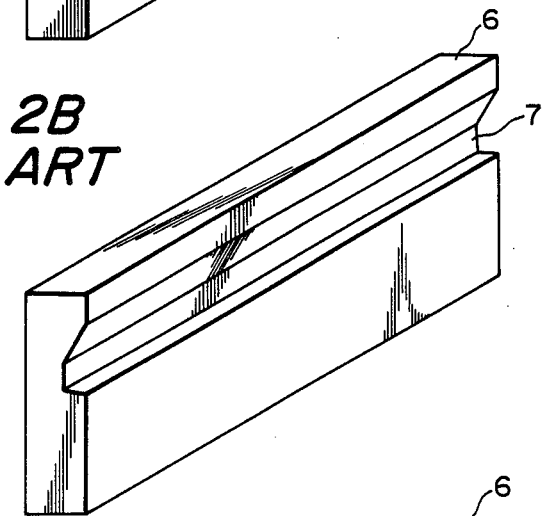
Figure 2C:
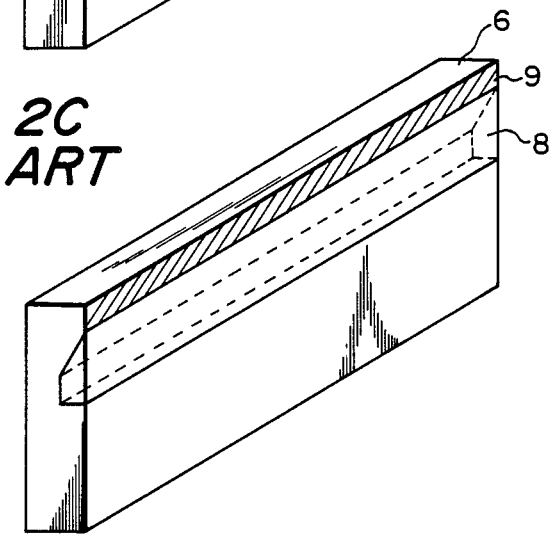
Figure 2D:
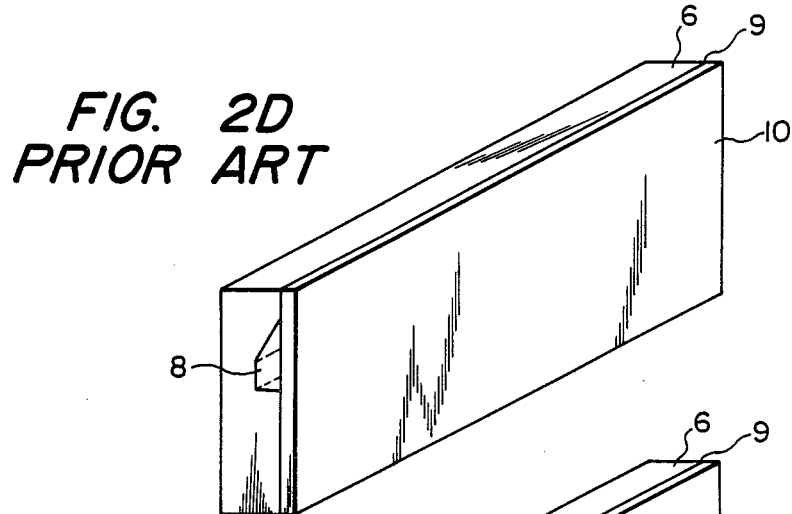
Figure 2E:
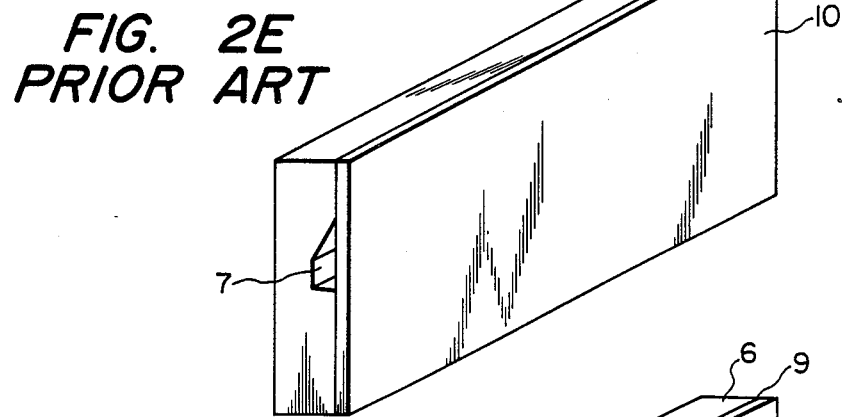
Figure 2F:
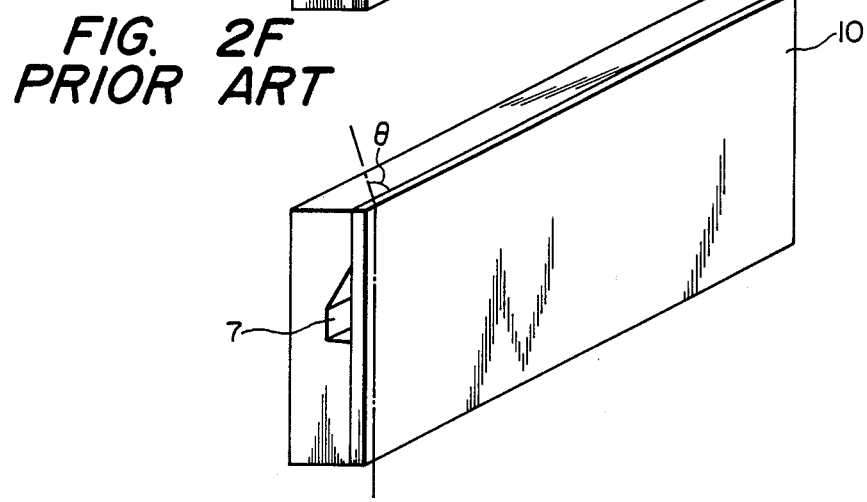
Figure 2G:
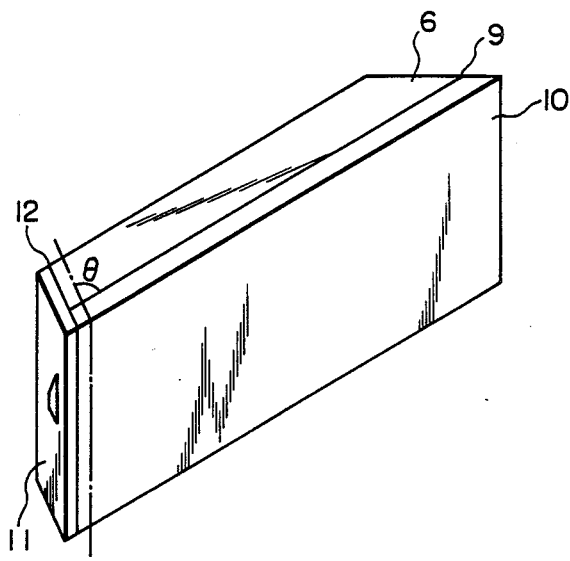
Figure 2H:
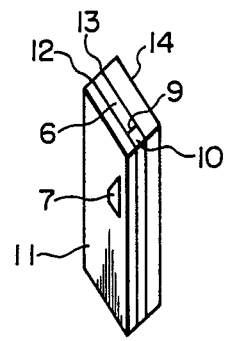
Figure 3A:
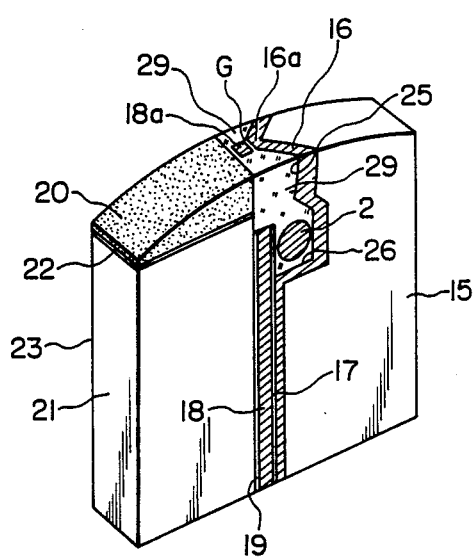
FIGS. 3A and 3B are perspective views showing structures of magnetic heads as an embodiment of the present invention, respectively.

FIG. 3A is a perspective view showing a structure of a magnetic core according to an embodiment of the present invention, in which the upper end surface of the magnetic core is the magnetic tape slide surface adapted to slide on a magnetic tape (not shown).

A ferrite chip 15 is made of ferrite of a magnetic material having a high permeability and constitutes a magnetic circuit of the core. The left upper end portion in the diagram is formed so as to have a V-shaped cross section by a groove 25 when seen from the upper side. Further, a winding groove 26, which is continuous to the groove 25, is formed.

A magnetic alloy film 16 is formed on the left end surface (in the diagram) where the groove 25 and winding groove 26 of the ferrite chip 15 are formed. The magnetic alloy film 16 is made of magnetic alloy having high saturation magnetic flux density such as Sendust or the like. The film 16 together with the ferrite chip constitutes a magnetic circuit of the core. The film 16 has a thickness of 5 to 20 $\mu$m. The V-shaped upper end surface of the magnetic alloy film 16 is exposed to the magnetic tape slide surface and its edge portion comes into contact with a magnetic gap G, thereby forming a first magnetic pole 16a.

A glass 29 of a low melting point serving as a nonmagnetic adhesive agent is embedded into the groove 25 and winding groove 26. A winding window 2 of a circular hole is formed in the winding groove 26.

On the other hand, a second magnetic alloy film 18 is formed through a nonmagnetic film 17 on a portion of the magnetic alloy film 16 corresponding to the portion below the winding groove 26 and on the surface of the glass 29 of the low melting point embedded in the grooves 26 and 25, thereby forming the remaining portion of the magnetic circuit of the core. The nonmagnetic film 17 serves as a magnetic gap material film and forms the magnetic gap G. The upper end portions of the magnetic alloy film 18 and nonmagnetic film 17 are notched in the direction of a track width. The upper end portion of the film 18 is exposed as a second magnetic pole 18a to the magnetic tape slide surface and faces the first magnetic pole 16a of the film 16 through the magnetic gap G. The film 18 is made of magnetic alloy having a high saturation magnetic flux density similar to the magnetic alloy film 16 and has a thickness of 20 to 30 $\mu$m. The nonmagnetic film 17 is made of $SiO_2$ or the like and has a thickness of 0.2 to 0.3 $\mu$m.

Further, a reinforcing plate 23 is adhered to the magnetic alloy film 18 through an adhesive agent layer 19 of a thickness of 1 to 5 $\mu$m and the glass 29. The reinforcing plate 23 mechanically reinforces the film 18 and also reduces the resistance of the magnetic circuit. The reinforcing plate 23 is formed by joining a nonmagnetic material chip 20 constituting the magnetic tape slide surface onto a magnetic material chip 21 made of a magnetic material of high permeability such as, for example, polycrystalline ferrite or the like through an adhesive agent layer 22. The nonmagnetic material chip 20 has such a thickness that the bottom surface reaches the upper end portion of the winding groove 26. As a material of the nonmagnetic material chip 20, a material whose abrasion resistance is substantially equal to that of the ferrite chip 15, for example, nonmagnetic ferrite or the like is selected.

In the above structure, both sides of the V-shaped cross section in the left end portion which are exposed to the magnetic tape slide surface of the ferrite chip 15 are substantially rectilinear and have an angle above 20° with respect to the magnetic gap G, respectively. Namely, the boundary line of the magnetic tape slide surface between the ferrite chip 15 and the magnetic alloy film 16 is almost rectilinear and has an angle above 20° with regard to the magnetic gap G.

With this structure, it is possible to prevent the problem concerned with the function of the pseudo gap which is caused in the boundary line portion between different kinds of magnetic materials when such a boundary line exists on the magnetic tape slide surface and is parallel with the magnetic gap. Also, the noise which will be generated by this function can be prevented. On the other hand, the magnetic pole 18a of the second magnetic alloy film 18 is in contact with the nonmagnetic material chip 20 in the magnetic tape slide surface, so that the function of the pseudo gap won't be caused on the side of the magnetic alloy film 18 as well.

According to the structure of the embodiment as mentioned above, since the portions near the magnetic gap G are formed by the magnetic alloy films 16 and 18 having a high saturation magnetic flux density, the recording can be satisfactorily performed for the medium of a high coercive force for use in an 8 mm VTR and the like. In addition, since the magnetic alloy films 16 and 18 are magnetically coupled with the ferrite chip 15 and magnetic material chip 21 each of which has a high permeability and a large cross sectional area, the magnetic resistance is small as a whole and a high output can be obtained.

The magnetic core of the embodiment was manufactured so as to have a narrow track of a track width of 15 to 18 μm by a manufacturing method, which will be explained hereinafter. The head for recording and reproducing for a long time for use in the 8 mm VTR was produced from this core and the recording on and reproduction from a metal tape were performed. Thus, excellent performance was obtained.

Further, according to the magnetic core of the embodiment, since the magnetic resistance can be reduced by the magnetic material chip 21 of the reinforcing plate 23, the thickness of the magnetic alloy film 18 can be reduced to a value of about 20 to 30 μm, which is nearly equal to the gap depth. Therefore, the characteristics can be improved, for example, it does not take as tong to form the film, and the mass productivity can be improved.

Figure 3B:
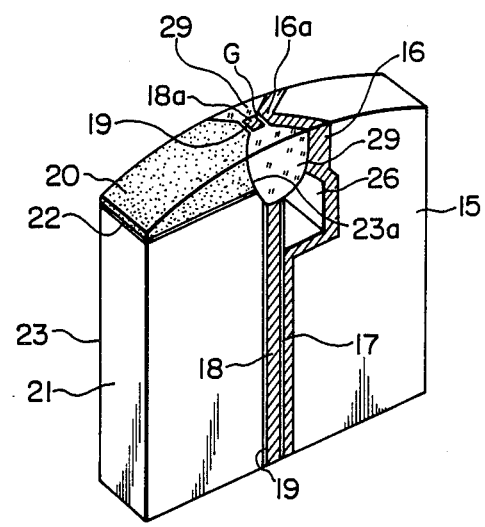

If the core of FIG. 3A according to this embodiment is modified as shown in FIG. 3B and a groove 23a is formed in the portion near the slide surface of the joining surface of the reinforcing plate 23, the adhesive strength of the reinforcing plate 23 can be increased. On the other hand, as shown in FIG. 3B, if the winding groove 26 is directly used to wind a winding without embedding the glass 29 of a low melting point into the winding groove 26, the space into which the winding pierces can be further enlarged. However, the modified form shown in FIG. 3B results in an increase in the number of steps of the manufacturing process. The manufacturing method of the magnetic core shown in FIG. 3A will now be described with reference to FIGS. 4A to 4G.

Figure 4A:
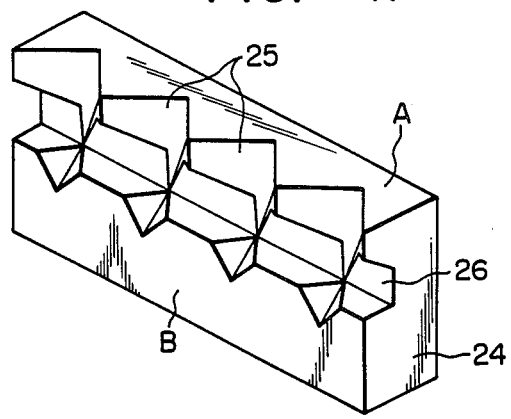
FIGS. 4A to 4G are diagrams showing a manufacturing process of the magnetic head shown in FIG. 3A.

First, as shown in FIG. 4A, a block 24, which forms the base material for the foregoing ferrite chip, is formed from ferrite having a high permeability. Further, the grooves 25 each having a V-shaped cross section and the winding groove 26 having a ]-shaped cross section are formed in the block 24.

In this case, it is preferable to use a monocrystalline ferrite as the ferrite of the block 24 so as to reduce the slide noise. It is also possible, on the other hand, to use a block such that monocrystalline ferrite was grown on polycrystalline ferrite which has recently been developed. In this case, by setting the monocrystalline portion to the A surface side which functions as a medium slide surface and by setting the polycrystalline portion having a small magnetic resistance to the lower portion side, the magnetic resistance of the finished product can be reduced more and more. Therefore, this composition is even more advantageous.

The winding groove 26 is formed in the B surface adjacent to the A surface extend parallel to the A surface.

A number of grooves 25 are adjacently formed at the corners of the A and B surfaces such that each groove has the V-shaped cross section in correspondence to the angle of the boundary line between the ferrite chip 15 and the magnetic alloy film 16 with regard to the magnetic gap G. The portion of the side surface of the groove 25 which reaches at least the winding groove 26 is perpendicular to the A surface in order to prevent occurrence of a deviation in track position in the direction of depth of the magnetic gap.

Figure 4B:
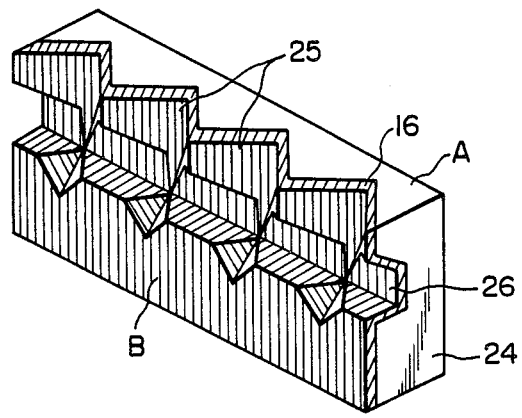

Next, as shown in FIG. 4B, the magnetic alloy film 16 is formed on the B surface of the block 24. Examples of materials from which the film 16 can be formed from, a magnetic alloy of high saturation magnetic flux density, include Sendust, permalloy, amorphous, or the like. The film 16 may be formed by, for example, a sputtering method, plating method, or the like. In the case of sputtering Sendust, the coefficients of linear expansion of Sendust and ferrite fairly differ. Therefore, to improve the adhesion between them, it is preferable to form an underlayer on the B surface of the block 24 before sputtering. It is also necessary to properly set the temperature of the block 24 when sputtering.

Figure 4C:
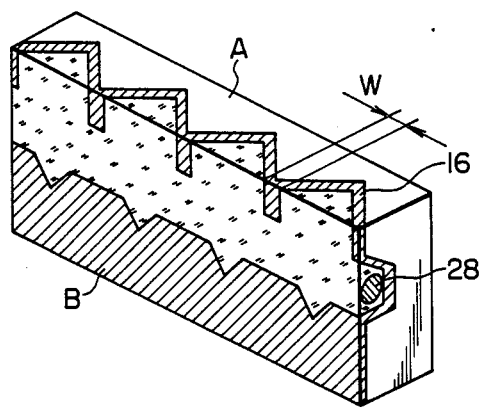

Next, after a carbon rod 28 shown in FIG. 4C is inserted into the winding groove 26, the winding groove 26 and groove 25 are filled with a melted glass 29. Further, after the glass is solidified, the B surface is polished to obtain a track width w on the side of the magnetic alloy film 16. In the case of finally cutting the assembly at the azimuth angle θ, the actual track width Tw is wcosθ.

Figure 4D:
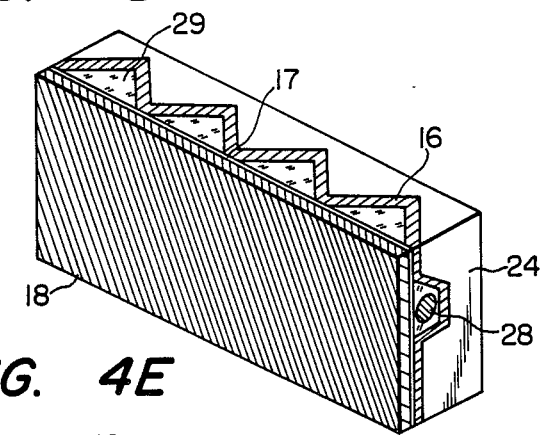

Next, as shown in FIG. 4D, the nonmagnetic film 17, to form the magnetic gap G, is formed on the B surface in FIG. 4C by sputtering, for example, SiO₂ or the like. Further, the second magnetic alloy film 18 is formed on the film 17 by the same material and method as those in the case of the first magnetic alloy film 16. It is desirable to form the magnetic alloy film 18 by quite the same material as the magnetic alloy film 16 in terms of the abrasion resistance.

Figure 4E:
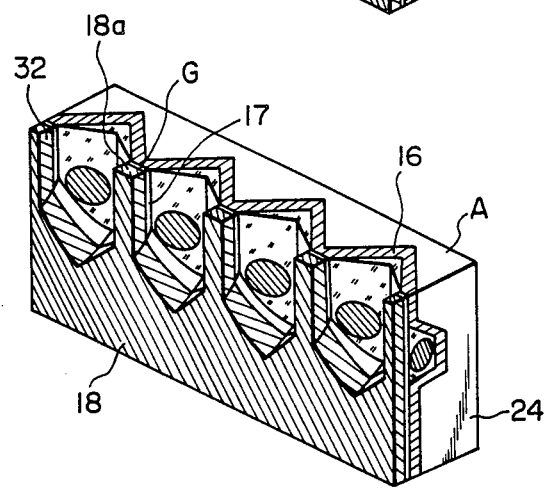

Subsequently, as shown in FIG. 4E, grooves 32 are formed at the position corresponding to the groove 25 in the B surface in FIG. 4D at regular intervals of the track width w. By forming these grooves, the widths of the upper end portions of the nonmagnetic film 17 and magnetic alloy film 18 which will be exposed to the magnetic tape slide surface as the magnetic gap G and magnetic pole 18a in the finished product core are set to the track width w.

Figure 4F:
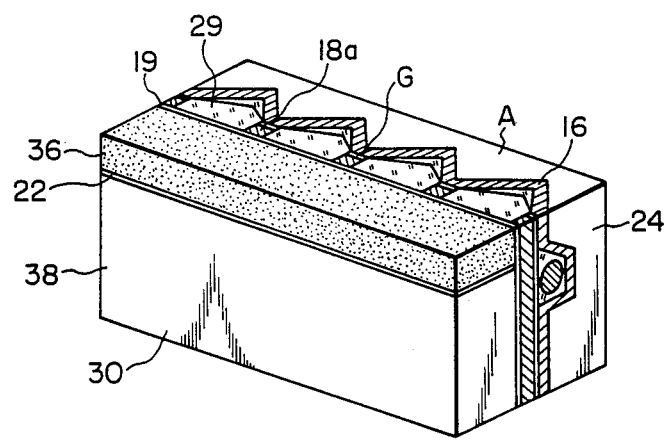

Further, as shown in FIG. 4F, the reinforcing block 30, which functions as a base material of the reinforcing plate 23, is adhered to the B surface of the block in FIG. 4E through the adhesive agent layer 19 of a thickness of 1 to 5 μm. The melted glass 29 is then poured into the grooves 32 to fuse and adhere both blocks, thereby raising the junction strength.

The reinforcing block 30 is formed by adhering a nonmagnetic material plate 36 to a magnetic material block 38 through the adhesive agent layer 22. The plate 36 has a rectangular parallelepiped shape and is made of a nonmagnetic material having substantially the same abrasion resistance as the block 24. The block 38 also has a rectangular parallelepiped shape and is made of a magnetic material having a high permeability such as ferrite or the like which is similar to the block 24.

Figure 4G:
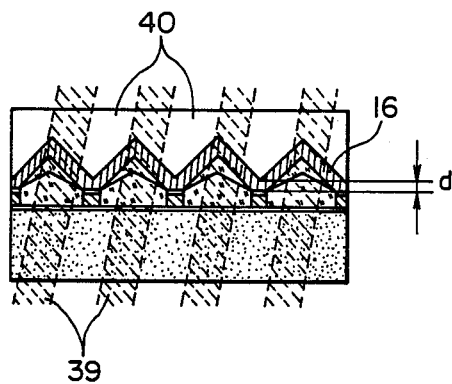

Then, as shown in FIG. 4G, the whole assembly is cut along cut portions 39 to obtain magnetic core chips 40. Thereafter, the carbon rod 28 is pulled out of the winding groove of each chip to form a winding window. Further, the A surface of each chip is worked as the magnetic tape slide surface into a predetermined shape, so that the magnetic core of FIG. 3A is finished. Although the core of FIG. 3A doesn't have any azimuth angle, FIG. 4G shows the case of cutting the cores at an azimuth angle.

It is desirable that the distance d shown in FIG. 4G, namely, the distance from the pointed edge of the ferrite portion, which will become the ferrite chip 15, to the magnetic gap G is ideally set to 0. This is because since the pointed edge becomes the point having specificity when an external magnetic field is formed and received, if the distance d exists, there will occur the function similar to the pseudo gap function such that the magnetic gap length is the sum of the gap length tg of the actual magnetic gap G and the distance d.

However, it is extremely difficult to stop the grinding work just at the position of the edge of ferrite when the B surface in FIG. 4B is ground in order to completely eliminate the distance d. Therefore, in the actual grinding process, the case where the surface of the edge portion of ferrite is exposed because of the excessive grinding work is allowed rather than the case where the distance d occurs because of the lack of grinding work.

Figure 5:
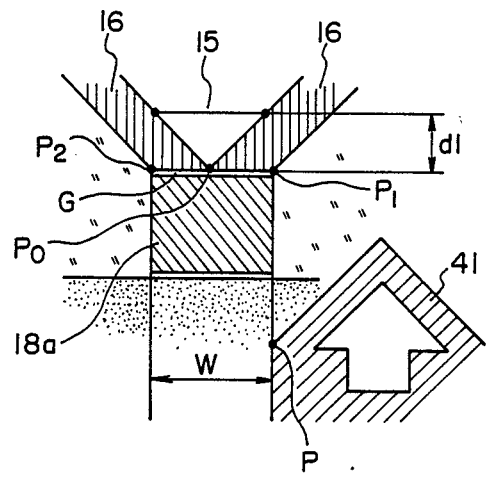
FIG. 5 is a diagram for explaining a working accuracy of the magnetic head shown in FIG. 3A.

A fairly high accuracy is required for the digging depth when forming the grooves 32 in FIG. 4E. In other words, as shown in FIG. 5, to form the grooves 32, it is ideal to insert a blade 41 of a cutting tool in the direction indicated by an arrow and to stop the blade 41 at the position where a corner point P of the blade 41 coincides with an edge point $P_1$ of the magnetic gap 17. However, it is extremely hard to realize this method.

In this case, it is allowed to insert the blade to the position slightly deeper than the point $P_1$ in the direction of the arrow although the magnetic alloy film 16 is slightly dug rather than the case where the magnetic pole 18 partially remains without being dug because the point P doesn't reach the point $P_1$. This allowable width is the distance $d_1$ shown in FIG. 5 and $d_1 = w/2$ when the angle at the edge of the ferrite portion is 90°. To easily perform the digging work of the grooves 32, it is sufficient to enlarge the distance $d_1$. For this purpose, the track width w is set as large as possible and the angle at theedge of the ferrite chip 15 is reduced as small as possible.

According to the manufacturing method of this embodiment mentioned above, the magnetic gap is obtained by merely forming the films without performing the abutting process, so that a variation in gap width can be reduced as compared with the conventional method. For example, in the conventional method, even if a desired gap width is set to 0.25 μm, there is actually a variation of 0.2 to 0.3 μm. However, according to the manufacturing process of the embodiment, the variation could be suppressed to about 0.24 to 0.26 μm. In this embodiment, since the variation in gap width can be reduced as mentioned above, the characteristics of the magnetic cores can be uniformed and stabilized and the yield can be improved. When a pair of magnetic heads constituted by these cores are assembled in a magnetic recording and reproducing apparatus, the uniformity of the characteristics makes it possible to simplify the process to match the characteristics of both heads by an electrical method. Thus, the costs of the magnetic recording/reproducing apparatus can be reduced.

Further, according to the manufacturing method of the embodiment, a number of cores can be finally obtained at a time by cutting the block. This method doesn't have the drawbacks in the foregoing conventional method . Therefore, according to the embodiment, the magnetic cores of FIGS. 3A and 3B can be cheaply manufactured with a high mass productivity.

In the manufacturing process according to the embodiment, there isn't any particular difficulty in obtaining the accurate track width by grinding the B surface in FIG. 4B and the like; however, a fairly high working accuracy is required. In addition, when the grooves are dug as shown in FIG. 4E, the top end portion of the magnetic alloy film 18, which functions as the magnetic pole, may be peeled off by the shock upon digging work of the grooves.

Therefore, another embodiment of the invention in which such problems can be reduced and the mass productivity can be further improved will now be described with reference to FIGS. 6 and 7A to 7H. In these diagrams, the parts and components which are the same as or correspond to those in FIGS. 3A to 5 are designated by the same reference numerals and their detailed descriptions are omitted.

Figure 6:
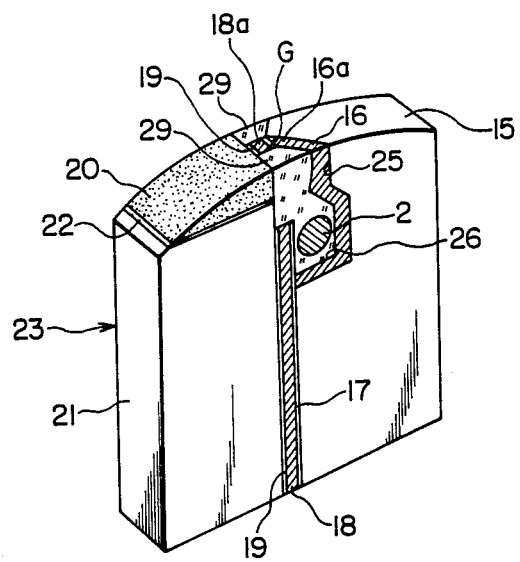
FIG. 6 is a perspective view showing a structure of a magnetic head as another embodiment of the present invention.

FIG. 6 is a perspective view showing a structure of a magnetic core according to this embodiment. As shown in this diagram, in the core of the embodiment, the portions where the grooves 25 and magnetic alloy film 16 are formed differ from those of the core shown in FIG. 3A.

Namely, in the core of this embodiment, the grooves 25 are formed at the positions which are deviated to left rear side in the diagram as compared with the case of FIG. 3A, and the V-shaped edge which is formed by the groove 25 in the left upper end portion (in the diagram) of the ferrite chip 15 is in contact with the edge on the left rear side (in the diagram) of the magnetic gap G. The magnetic alloy film 16 is formed on only the right side surface of the edge surface . The edge of the film 16, formed on only the right side surface, faces the magnetic pole 18a and forms the magnetic pole 16a so as to sandwich the magnetic gap G. The film 16 is formed to only the bottom surface of the winding groove 26 of the ferrite chip 15.

The structure of the other portions of the core in this embodiment is similar to the core of FIG. 3A.

According to such a structure, the similar function and effect can be obtained because of structural reasons similar to the case of the first embodiment and at the same time, the manufacturing process can be further simplified and the mass productivity can be further improved as will be explained hereinafter.

The manufacturing process of the core of this embodiment will now be described.

Figure 7A:
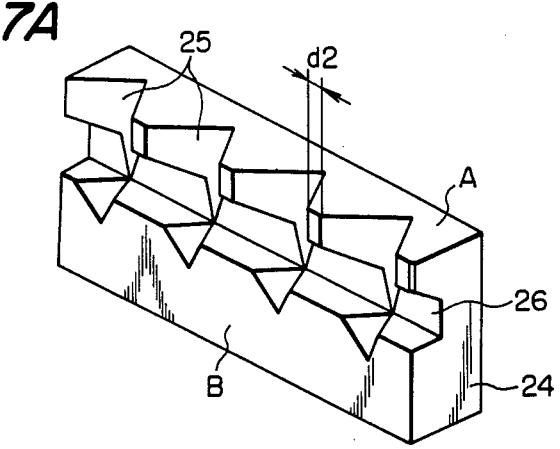
FIGS. 7A to 7H are diagrams showing a manufacturing of the magnetic head shown in FIG. 6.

First, as shown in FIG. 7A, the grooves 25 and winding groove 26 are formed in the block 24. In this case, different from the first embodiment, the grooves 25 are formed at regular intervals of a predetermined distance $d_2$.

Figure 7B:
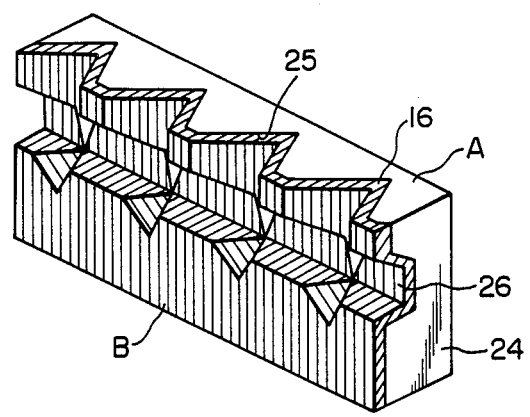

Next, as shown in FIG. 7B, the magnetic alloy film 16 is formed on the B surface of the block 24 of FIG. 7A in a manner similar to the case of the first embodiment.

Then, similarly to the first embodiment, the carbon rod 28 is inserted into the winding groove 26 and the grooves 25 and winding groove 26 are filled with the glass 29 of a low melting point. Thereafter, the B surface in FIG. 7B is ground and polished until it becomes such a state as shown in FIG. 7C, namely, until the deposited portions other than the portions where the magnetic alloy film 16 was deposited on the grooves 25 and winding groove 26 are completely removed.

Figure 7C:
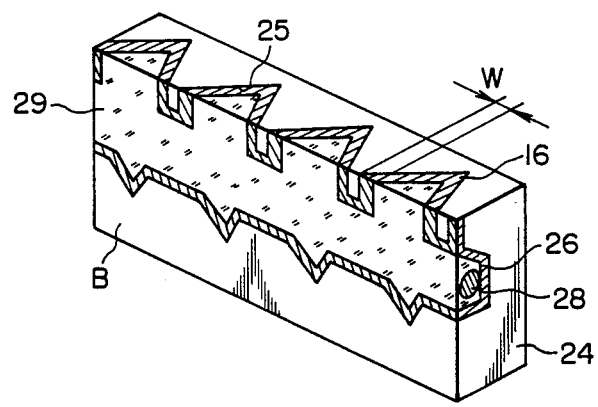

In this case, the width w of the edge surface of the film 16 which will be exposed to the B surface in FIG. 7C after completion of the grinding and polishing work becomes the track width w on the side of the magnetic alloy film 16. Therefore, different from the case of the first embodiment, the track width is independent of a grinding amount. Thus, the track width can be easily managed by the thickness of film 16 which is formed on the side surface of the groove 25.

Figure 7D:
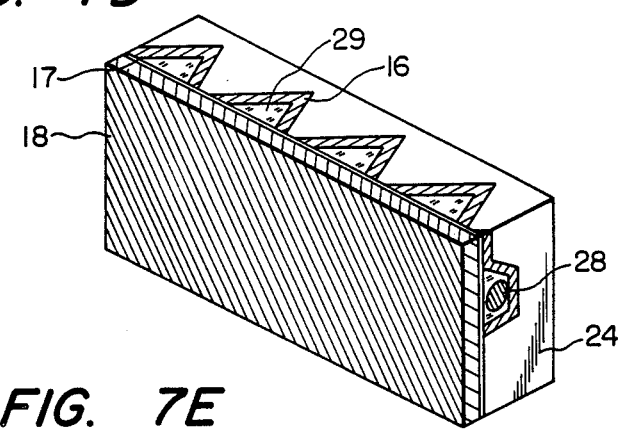

Next, as shown in FIG. 7D, the nonmagnetic film 17 is formed on the B surface in FIG. 7C and the second magnetic alloy film 18 is further formed on the film 17 similarly to the case of the first embodiment.

Figure 7E:
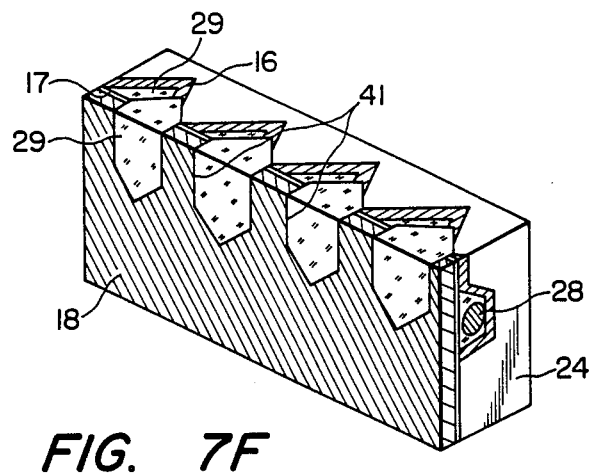

Subsequently, as shown in FIG. 7E, grooves 41 are formed and the left side edges (in the diagram) of the upper end portions of the magnetic alloy film 18 and nonmagnetic film 17, which will become the magnetic pole 18a and magnetic gap G, are determined. Thereafter, the grooves 41 are filled with the glass 29.

Figure 7F:
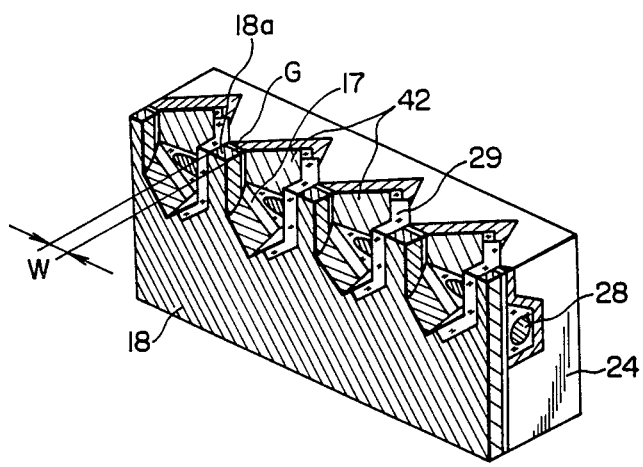

Then, as shown in FIG. 7F, grooves 42 are formed and the right side edge (in the diagram) of the upper end portion is determined to set the track width w. In this case, the strength of the upper end portion is high since it is reinforced by the glass 29, so that it will be hardly peeled off.

By setting the track width on the side of the magnetic pole 18a by digging the grooves twice as described above, the occurrence of the peel-off of the portion near the magnetic pole 18a of the film 18 can be reduced.

Figure 7G:
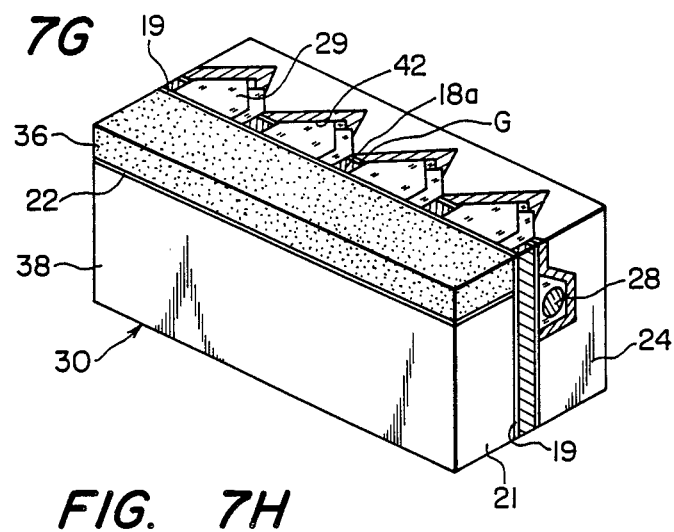

Next, as shown in FIG. 7G, the reinforcing block 30 is adhered through the adhesive agent layer 19 and glass 29 embedded into the grooves 42.

Figure 7H:
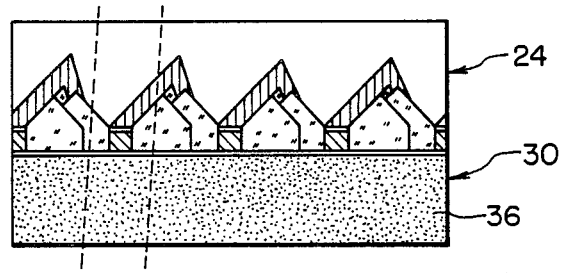

Next, the whole assembly is cut along broken lines shown in FIG. 7H. Thereafter, the processes similar to those in the case of the first embodiment are executed, so that the magnetic core of FIG. 6 is finished.

In this manner, the track width on the side of the magnetic alloy film 16 is set and the problems of peel-off of the magnetic alloy film 18 and the like are eliminated. Thus, the magnetic core of FIG. 6 can be cheaply manufactured with a high mass productivity.

In each of the foregoing embodiments of FIGS. 3 and 6, the width of the magnetic pole 18a, namely, the track width in the case where the azimuth angle is 0° as been set by mechanically digging the grooves. However, it can be also set by a chemical method, for example, by a photolithography in the following manner.

First, after the magnetic alloy film 18 in FIG. 4D or 7D was formed, a photoresist of a thickness of a few μm is coated on the film 18 by a spin coater. Thereafter, a resist layer is formed on only the region where the film 18 should be left by the light irradiation and developing process.

Next, the etching is performed by a wet process or by a dry process such as ion milling or the like to remove the film 18 in the portion which is not coated by the resist layer, thereby forming the magnetic pole 18a. Then, the resist layer is removed.

Figure 8:
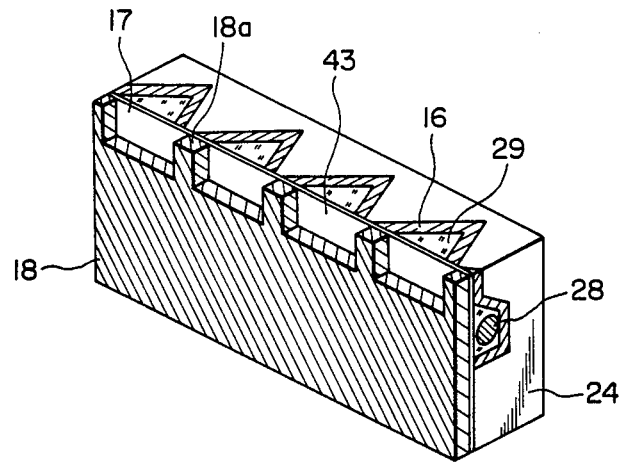
FIG. 8 is a diagram showing another manufacturing process of the magnetic head shown in FIG. 6.

FIG. 8 shows a state in which the magnetic poles 18a were formed by the above-mentioned processes after completion of the process in FIG. 7D. A portion indicated at a numeral 43 is a removed portion of the magnetic alloy film 18 by the etching. Thereafter, by executing the processes similar to those after FIG. 7F, the magnetic core can be obtained.

According to this method, no mechanical stress is applied to the film 18, so that the peel-off of the film 18 can be fairly effectively prevented. This method is suitable to work with narrow track cores.

However, the magnetic alloy film 18 of a thickness of at most about 10 μm can be sharply removed by a single etching process. Therefore, in the case of obtaining the film 18 of a thickness which is thicker than 10 μm, the film forming and photolithography processes are alternately executed a plurality of times.

As shown in FIGS. 3A and 6, the head using the core half bodies of the A type MIG head which is manufactured without performing the abutting process has a large advantage such that the contour effect can be perfectly prevented. However, on the contrary, the manufacturing process is relatively complicated and the high working accuracy is required, so that the cost of the finished product is high.

Therefore, in the P type MIG head which is manufactured without performing the abutting process, if the magnetic core can be manufactured without causing the problems such as the adverse influence by the contour effect and the like, this method will be remarkably advantageous in terms of the costs.

In general, in such a kind of MIG head, the internal stresses are accumulated between ferrite and the metal magnetic film. Therefore, some cracks may be caused in one ferrite block due to the accumulation of the internal stresses, causing the yield of the products to deteriorate.

Further, when the internal stresses are accumulated near the boundary between the metal magnetic film and ferrite, the discontinuity of the magnetic characteristics at the boundary increases, the contour effect is also enhanced, and the electromagnetic converting characteristics of the head deteriorate.

Therefore, an embodiment of a magnetic head which can reduce the occurrence of the contour effect in the P type MIG head and whose manufacturing process is relatively simple will now be described hereinbelow.

FIG. 9 is a perspective view showing an outline of an embodiment of such a type of head. FIGS. 10A to 10F are diagrams for explaining an outline of the manufacturing process of the head of FIG. 9. FIGS. 11A to 11C are diagrams showing various kinds of embodiments in each of which a structure on the slide surface differs from that of the head of FIG. 9.

In FIG. 9, reference numeral 101 denotes a block of a high permeability material such as monocrystalline ferrite or the like, and 102 is an alloy magnetic material as a first magnetic film which is formed on the block 101 by a physical evaporation deposition such as, for example, a sputtering method or the like. The material 102 has a high saturation magnetic flux density and is made of permalloy, Sendust, amorphous, or the like. Numeral 106 is a gap material of $SiO_2$ or the like which is similarly formed on the material 102 by the sputtering method or the like, and 107 is an alloy magnetic material serving as a second magnetic film which is likewise formed on the gap material 106 by the sputtering method or the like.

Numeral 103 ($103_1$ to $103_3$) is a groove for a winding window. The wall surface of the groove 103 are filled with glass 105 of a low melting point. Numeral 109 designates a glass of a low melting point having a melting point which is equal to or lower than that of the glass 105; 110 to 112 designate protecting plates in which 110 is the nonmagnetic material having high abrasion resistance such as nonmagnetic ferrite, crystallized glass, or the like, 111 is the material of high permeability such as, for example, ferrite monocrystal, and 112 is the adhesive agent having a melting point which is equal to or higher than that of the glass 109; and 113 designates a winding window.

Features in manufacturing and structure of the head of this embodiment will be explained. First, the function of the elements of the magnetic pole - gap-magnetic pole which is the fundamental structure as a head is satisfied by the material 102 of high saturation magnetic flux density as the first magnetic pole, gap material 106, and material 107 of high saturation magnetic flux density as the second magnetic pole which are sequentially formed as the films on the base plate 101 of the material of high permeability. On the head slide surface, the boundary between the base plate 101 and the material 102 is parallel with the gap 106, so that it is difficult to completely suppress the occurrence of the contour effect. However, it has been found that the occurrence of the contour effect can be suppressed to a degree such that it does not practically cause the problem with the aid of a structure as will be explained hereinafter. On the side of the slide surface of the protecting plate there is formed the nonmagnetic material 110, so that the gap or adhesive agent layer between the material 110 and the second magnetic pole 107 doesn't become a pseudo gap. On the other hand, the lowest point $P_1$ of the nonmagnetic material 110 or 112 of the protecting plate on the side which faces the gap is located at the position which is as high as or slightly lower (the slide surface is the upper side) than a top end point $P_2$ of the groove wall surface $103_1$ for the winding window. However, it is preferable that the lowest point $P_1$ is located near the slide surface as close as possible in terms of the characteristics. This is because, as the material 111 of high permeability of the protecting plate is close to the slide surface, the magnetic resistance of the magnetic circuit decreases. In the case of such a head structure, the effective gap depth is determined by either one of the points $P_1$ and $P_2$ which is closer to the slide surface.

It should be noted that the most characteristic point in structure of this embodiment is that the metal magnetic material as much as possible is removed from the wall surfaces $103_1$, $103_2$, and $103_3$ of the groove 103 to form the winding window 113 formed in the ferrite core 101. Further, the groove is formed in the core edge portion near the gap 106 on the slide surface so as to become substantially the parallel side surfaces in order to obtain the accurate track width. However, no metal magnetic material is formed on the side surfaces of the ferrite core 101, which will be exposed by digging the groove.

A method of manufacturing the head having the above-mentioned structural features will now be described with reference to FIGS. 10A to 10F.

Figure 10A:
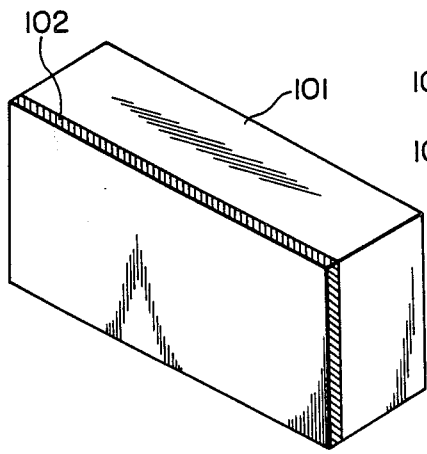
FIGS. 10A to 10F are diagrams showing a manufacturing process of the magnetic head shown in FIG. 9.
Figure 10C:
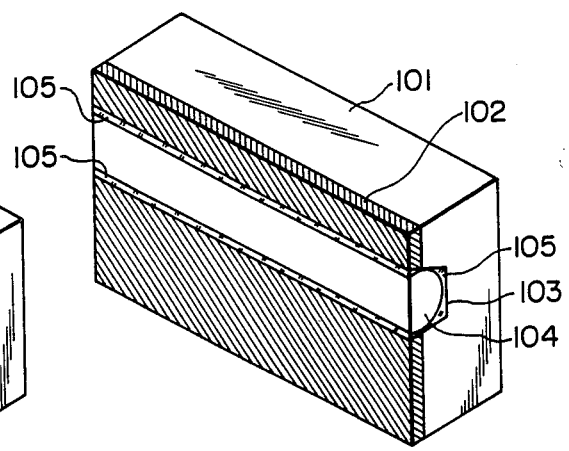
Figure 10B:
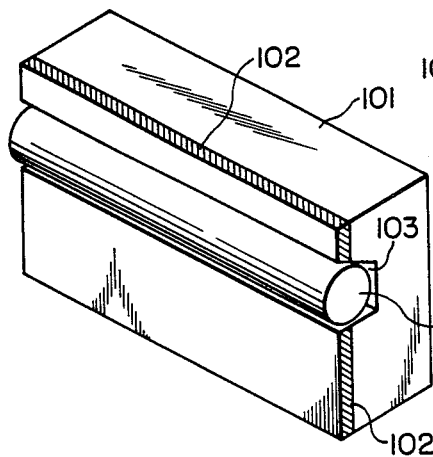
Figure 10D:
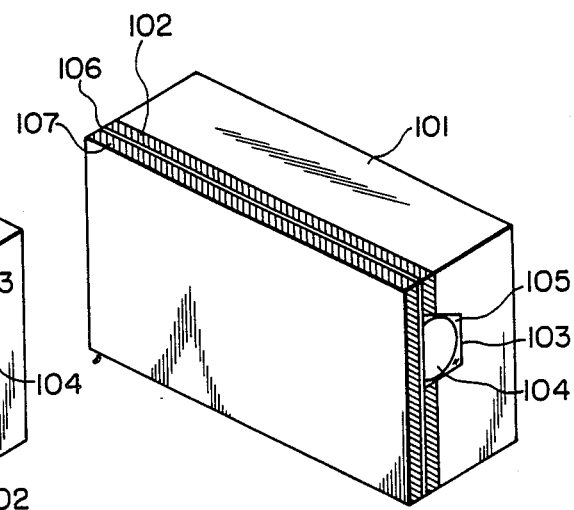

In FIG. 10A, numeral 101 denotes a part of the rectangular parallelepiped block of ferrite monocrystal. The material 102 of high saturation magnetic flux density having a thickness of about 10 to 50 μm is formed as a film on one surface of the block 101 by physical evaporation depositing method, plating method, CVD method, or the like. In the case of using Sendust as a material of high saturation magnetic flux density, if the surface of the film 102 is parallel with or convex with regard to the surface of ferrite 101, the occurrence of the internal stresses can be suppressed. After the film is formed, as shown in FIG. 10B, the first groove 103 for the winding window is dug and a thin wire 104 such as aluminum, copper, nickel, zinc, iron, or the like is inserted into the groove 103. Then, the groove 103 is filled with the first glass of a low melting point of about 550° to 600° C. FIG. 10C shows a state in which after the groove has been filled with the first glass 105 of the low melting point, the left side surface (in the diagram) is lapped to become the flat surface in order to form the gap surface. After the lapping work to form the flat surface, the gap material 106 such as $SiO_2$ or the like is first formed as a film having a thickness of, e.g., 0.2 to 0.3 μm and the second metal magnetic film 107 of a thickness of about 10 to 50 μm to form another magnetic pole is then formed as shown in FIG. 10D in accordance with the design.

Figure 10E:
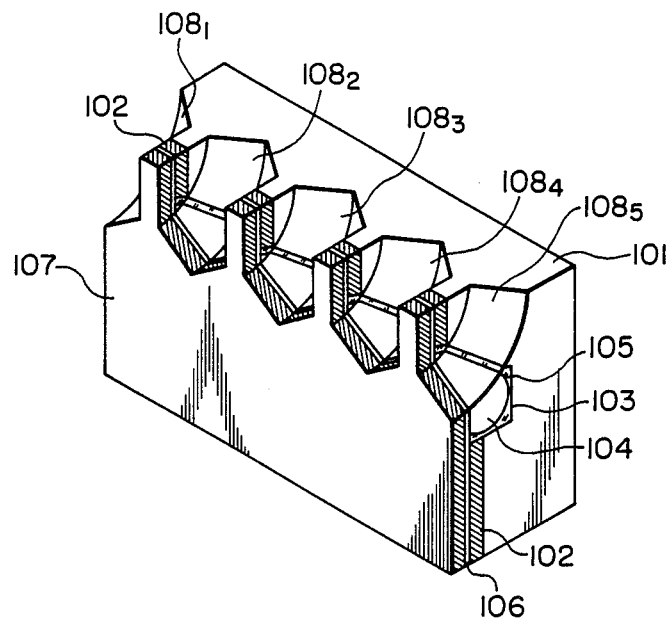

FIG. 10E shows a state in which second grooves $108_1$ to $108_5$ were dug in order to restrict the track width near the gap. Both side surfaces of the track width restricting portion which is sandwiched by the grooves are almost parallel. If there are problems with respect to the adhesion among the films 102, 106, and 107 of three layers and with ferrite 101 and the like, and, therefore, the grooves $108_1$ to $108_5$ cannot be worked at the same, the grooves to restrict the right side of the track and the grooves to restrict the left side are separately formed. On the other hand, when the grooves are filled with glass of a low melting point, in order to prevent the reaction between the metal magnetic film and the glass of a low melting point, it is desirable to reduce the thickness of the metal film and metal oxide film such as Cr, $CrO_3$, or the like on the surface of the metal magnetic film exposed to the groove surface.

Figure 10F:
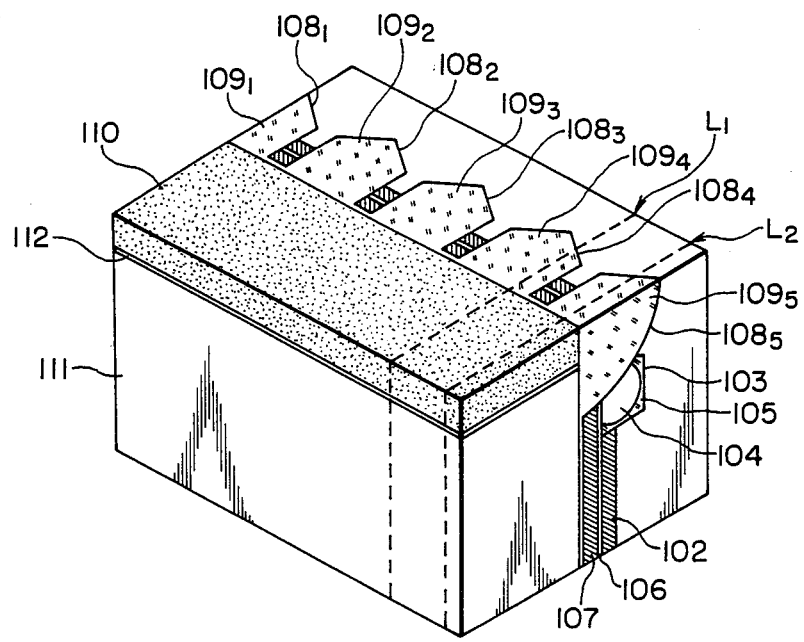

FIG. 10F shows a state in which the protecting blocks 110 to 112 which have been prepared and were melted and adhered by second glasses $109_1$ to $109_5$ each having a low melting point of about 500° to 550° C. by use of the grooves $108_1$ to $108_5$ to work form the track width. The upper side and slide surface side of each protecting block is the nonmagnetic material 110 and the lower portion is the material 111 having a high permeability such as ferrite monocrystal or the like. The two materials 110 and 111 are adhered by the adhesive agent 112 such as a third glass of low melting point of about 550° to 600° C. or the like. The core block is cut along broken lines $L_1$ and $L_2$ as shown in FIG. 10F, thereby obtaining a chip. This chip is dipped into an alkaline liquid such as a sodium hydroxide aqueous solution or the like, or into an acid liquid such as hydrochloric acid or the like, or the chip is subjected to other similar chemical processes, thereby dissolving and removing the metal rod 104 buried into the groove for the winding window. In this manner, the winding window is formed. FIG. 9 shows a schematic perspective view of a head chip after completion of the work of the outside appearance of the slide surface and the like.

In the case of the head for use in azimuth recording, it is sufficient to cut the block assembly at a proper angle of inclination without cutting it perpendicular to the direction of the gap length as shown in FIG. 10F. No problem will be caused even if the metal magnetic film of a thickness of about a few μm is left on the wall surface 103 of the groove portion for the winding window within the purview of the invention without departing from the spirit of the invention. Namely, as in the manufacturing process of the head in which the conventional abutting process is eliminated, after the groove for the winding window was formed, the process to cover the groove portion is newly executed, and thereafter the metal magnetic film may be formed. However, it should be allowed that a small amount of metal magnetic film is deposited on the wall surface of the groove portion for the winding window because of the insufficient cover. On the other hand, as in the conventional process, after a film was also formed on the groove portion for the winding window, it may be also removed in an amount of a proper thickness. In brief, it is important that the film thickness of the groove portion for the winding window is substantially thinner than the film thickness of the portion which constitutes the gap portion.

FIGS. 11A to 11C show the slide surfaces of other embodiments similar to that of FIG. 9. In the embodiments of FIGS. 11A and 11B, the thickness of the metal magnetic film 102 on the side of ferrite 101 on one side of the gap differs from the thickness of the metal magnetic film 107 on the side of the nonmagnetic material 110 on the other side of the gap. With this constitution, the symmetry of the magnetic pole structures on both sides of the gap is lost, thereby suppressing the contour effect. In the case of FIG. 11A, the thickness of the metal magnetic film 102 on the side of ferrite 101 is about 20 μm and the thickness of the metal magnetic film 107 on the side of the nonmagnetic material 110 is about 35 μm. It is desirable to set the thickness of the metal magnetic film 107 on the side of the nonmagnetic material to be thicker as mentioned above from the viewpoint to reduce the magnetic resistance of the core on the side of the nonmagnetic material. Fig. 11B shows the case where both side surfaces of the core edge portion to restrict the track width are not parallel. However, this embodiment requires a high accuracy in working of the track width. As the film thickness increases to above 10 μm, the contour effect can be further suppressed.

Figure 12:
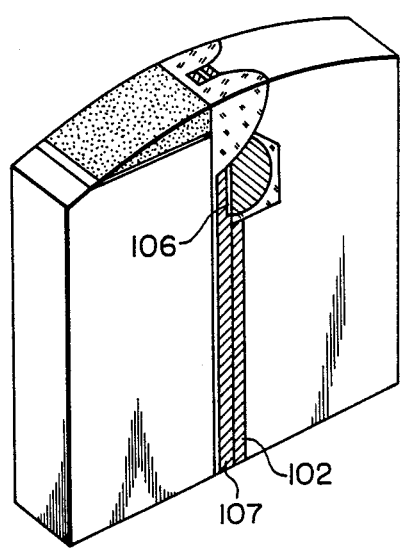
FIGS. 12 to 14 are diagrams showing magnetic heads of other embodiments in each of which a part of the composition differs from the magnetic head of FIG. 9.
Figure 13:
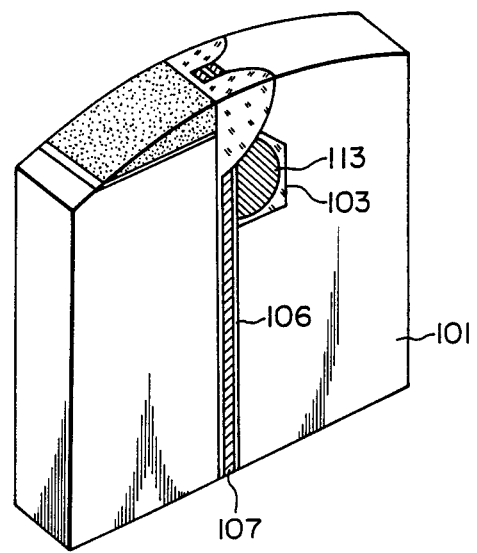
Figure 14:
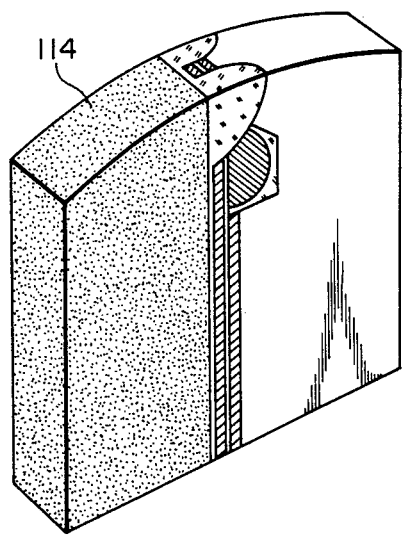

FIGS. 12 to 14 show perspective views of heads in other embodiment in each of which a part of the constitution differs from that of FIG. 9.

When comparing the head chip of FIG. 12 with the head chip of FIG. 9, it will be apparent that the gap material 106 is not formed until the side of the lower core portion. Therefore, on the side of the lower core portion, at least a part of the first metal magnetic film 102 and the second metal magnetic film 107 are directly adhered, so that there is the advantage to reduce the magnetic resistance of the lower core portion.

The head chip of FIG. 13 differs from the head chip of FIG. 9 with respect to the point that no metal magnetic film is formed on the wall surfaces of the groove 103 for the winding window of the core half body in which the winding window 113 is not formed on the side under and below the groove 103. In the lower core portion, the magnetic flux is directed perpendicular to the gap 107. However, when the magnetic flux changes, an eddy current flows through the metal magnetic film, causing the recording/reproducing efficiency to deteriorate. Therefore, the metal magnetic film is not formed on both of the wall surfaces and the lower side as mentioned above.

In the embodiment of FIG. 14, the whole protecting plate is formed of a nonmagnetic material 114 in order to reduce the costs.

In the embodiments shown in FIGS. 12 to 14, a part of the constitution in the embodiment of FIG. 9 has been changed. However, the invention can be also embodied by a combination of those modifications. On the other hand, in the head of FIG. 13, for example, it is also possible to use the structure such that the gap material 106 is not provided on the side of the lower core portion as shown in the head of FIG. 12 and the second magnetic pole 107 in FIG. 13 is not formed on the side of the lower core portion, but the materials 101 and 111 of high permeability are directly adhered or integrated on the side of the lower core portion.

In the embodiments described in FIGS. 9 to 14, in the case of using ferrite monocrystal as the material 101 of high permeability, if the crystal orientation of ferrite on the slide surface is set to 110 plane, excellent abrasion resistance will be obtained.

On the other hand, by reducing as small as possible the area of the metal magnetic film which is formed on the material of high permeability such as ferrite or the like of the core half body having the groove for the winding window and by decreasing the accumulation of the internal stresses which are caused in the manufacturing process of the head, the peel-off of the metal magnetic film and the cracks which may be caused in ferrite and fused and adhered glass are minimized. Thus, the yield in manufacturing of the heads could be remarkably improved.

Further, the accumulation of the internal stresses into the portion near the boundary between the metal magnetic material and ferrite could be minimized. Thus, the magnetic discontinuity at the boundary was reduced. The peak-to-peak value of the ripple by the contour effect was reduced to a low level below 1 to 2 dB at which no problems will be caused in practical use.

Embodiments in each of which the characteristic of the A type MIG head shown in FIG. 6 can be further improved will now be described with reference to FIGS. 15 to 22.

Figure 15:
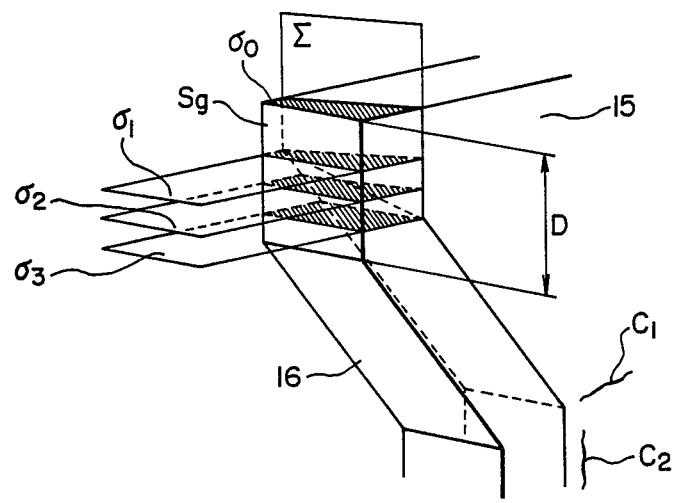
FIG. 15 is a diagram showing a state of a time-dependent change of the magnetic head shown in FIG. 6.

FIG. 15 is a diagram showing a core edge portion for explaining the improved point of the head shown in FIG. 6. In FIG. 15, D indicates a gap depth; $\sigma_0$ is a medium slide surface; Sg a magnetic gap forming surface; and Σ a boundary surface between the ferrite chip 15 and the Sendust film 16. The boundary surface Σ is not parallel with the surface Sg.

In association with the elapse of use time of time magnetic head, the medium slide surface changes from $\sigma_0$ to $\sigma_1$, $\sigma_2$, and $\sigma_3$. The magnetic film 16, which will be gradually exposed at the medium slide surface with such a change in the medium slide surface, is indicated by oblique lines. As will be obvious from the diagram, when the head is used and the gap depth changes, the shape of the metal magnetic material which appears on the slide surface won't change until the surface $\sigma_1$. However, on the surface $\sigma_2$, a part of the boundary between the metal magnetic material and the ferrite chip becomes parallel with the gap, and on the surface $\sigma_3$, the boundary is completely parallel with the gap, so that the contour effect occurs and the magnetic characteristic will deteriorate.

In the head of FIG. 6, crack as shown at $C_1$ and $C_2$ in FIG. 15 are caused in the ferrite chip 15 near the groove 26 for the winding window due to the accumulation of the internal stresses mentioned above, causing the yield of the products to deteriorate.

Figure 16:
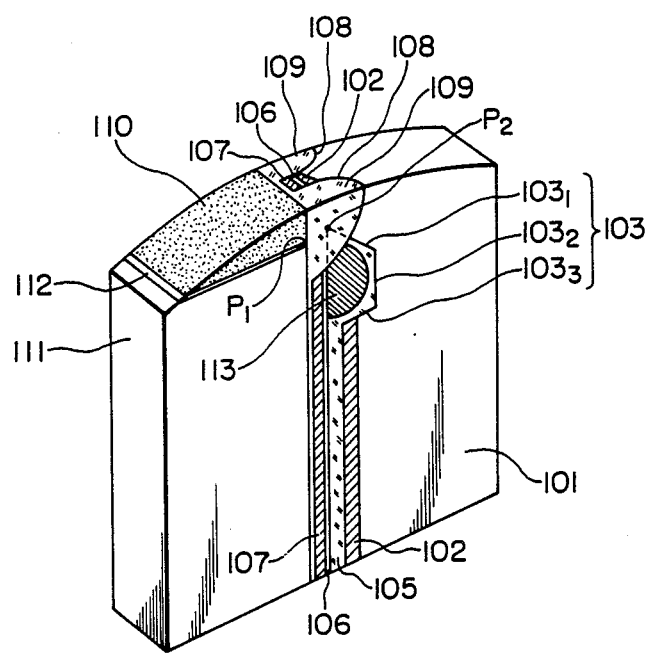
FIG. 16 is a diagram showing a structure of a magnetic head as still another embodiment of the invention.

FIG. 16 is a perspective view showing an outline of an embodiment of a head having a constitution which can solve such a problem. FIGS. 17A to 17G are diagrams for explaining an outline of a manufacturing process of the head of FIG. 16. FIGS. 18A to 18G are diagrams showing various types of embodiments in each of which a structure on the slide surface differs from that of the head of FIG. 16.

In FIGS. 16, 17A to 17G, and 18A to 18G, the parts and components which are the same as or correspond to those shown in FIGS. 9 to 11C are designated by the same reference numerals and their descriptions are omitted.

In the head shown in FIG. 16, the boundary on the medium slide surface between the base plate 101 of a high permeability material and the material 102 having a high saturation magnetic flux density is not parallel with the gap 106, so that the occurrence of the contour effect is suppressed. The most different structural point between the head shown in FIG. 6 and the head in this embodiment is that, in FIG. 16, the metal magnetic material was removed as much as possible from the wall surfaces $103_1$, $103_2$, and $103_3$ which from the groove 103 to form the winding window 113 formed in the ferrite core 101. Further, a groove 108 is formed in the core edge portion on the slide surface near the gap 106 so as to constitute almost the parallel side surfaces in order to obtain the accurate track width. However, no metal magnetic material is formed on the side surface of the ferrite core 101 which is exposed by digging the groove.

FIGS. 17A to 17G show the manufacturing process of the head having the foregoing structural feature.

Figure 17A:
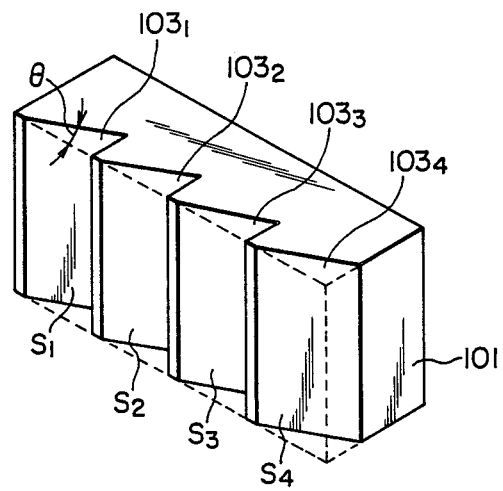
Figure 17B:
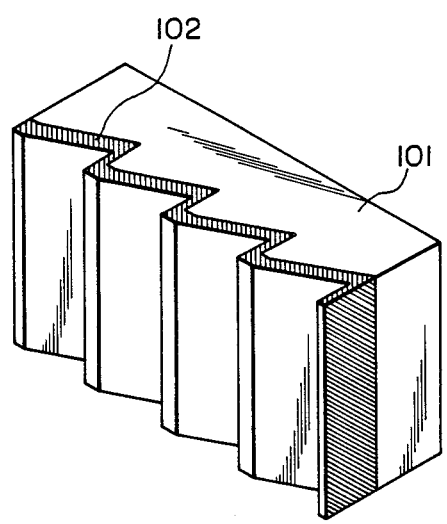
Figure 17C:
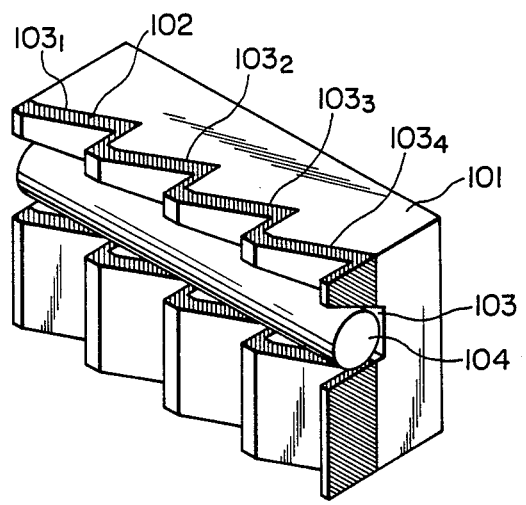
Figure 17D:
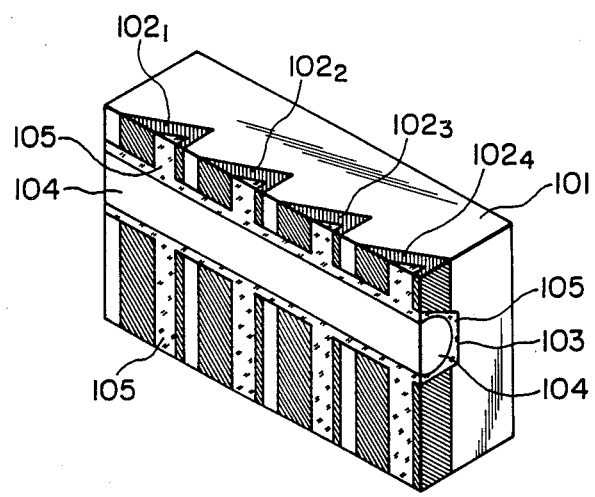

A number of parallel grooves $103_1$ to $103_4$ are formed in one surface of the ferrite block 101 shown in FIG. 17A. It is desirable that the angle $\theta$ between each of the oblique surfaces $S_1$ to $S_4$ of the grooves $103_1$ to $103_4$ and the original ferrite block surface is above 10°, more preferably, 30° to 50°. In FIG. 17B, the material 102 having a high saturation magnetic flux density is formed as a film so as to have the thickness of about 10 to 50 μm. In general, as the angle $\theta$ in FIG. 17A increases, and as the track width is widened, the film needs to be formed thicker.

The manufacturing processes shown in FIGS. 17C to 17G are similar to those shown in FIGS. 10A to 10F; therefore, their detailed descriptions are omitted.

In the process shown in FIG. 17A, the parallel grooves $103_1$ to $103_4$ are formed so as to have the same cross sectional shape from the top surface to the bottom surface of the ferrite block 101. However, as shown in FIGS. 4A to 4G and 7A to 7H, the grooves may be formed from the top surface of the block to positions before the bottom surface. In this case, the metal magnetic films of two layers which will appear on the side surface of the lower core portion have a shape as shown in FIG. 16.

Figure 18A:
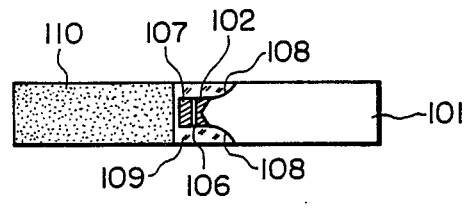
FIGS. 18A to 18G are diagrams showing constitutions on the medium slide surfaces of magnetic heads as other embodiments similar to the magnetic head of FIG. 16.
Figure 18B:
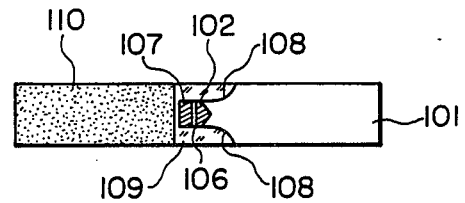
Figure 18C:
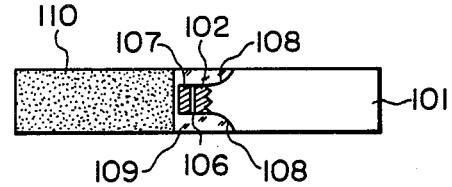
Figure 18D:
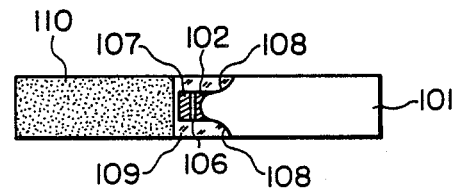
Figure 18E:
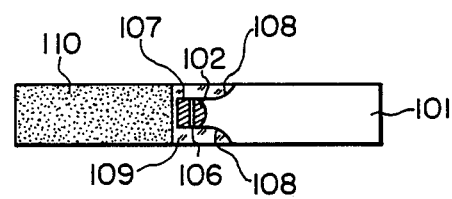
Figure 18F:
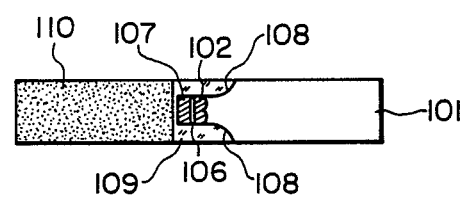
Figure 18G:
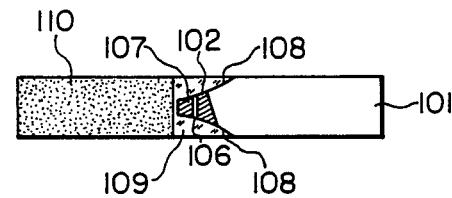

FIGS. 18A to 18F show constitutions on the slide surfaces of other embodiments similar to FIG. 16. Any of the embodiments has the following common constitution: (1) the boundary between the magnetic pole 102 of high saturation magnetic flux density material and the material 101 of high permeability is not parallel with the gap 106; (2) the boundary line of the core edge portion which restricts the gap length, accordingly, the track width is almost parallel; and (3) a film of a high saturation magnetic flux density material is not formed on the ferrite surface which will be exposed by working the groove 108 for winding. FIG. 18G shows a constitution on the slide surface of an embodiment which satisfies the above conditions (1) and (3) excluding (2). In this embodiment, high accuracy is needed in working to obtain a precise track width.

Figure 19:
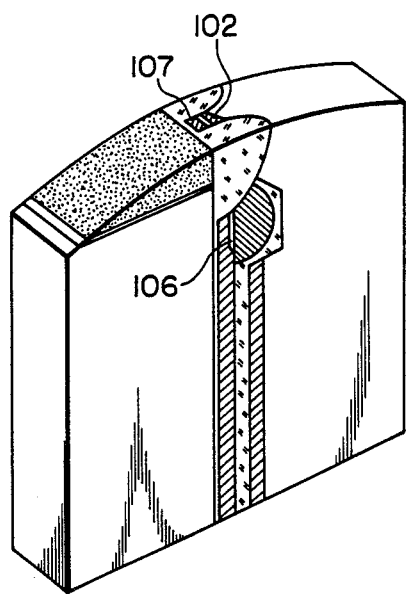
FIGS. 19 to 21 are diagrams showing magnetic heads of other embodiments in each of which a part of the constitution differs from the magnetic head of FIG. 16.
Figure 20:
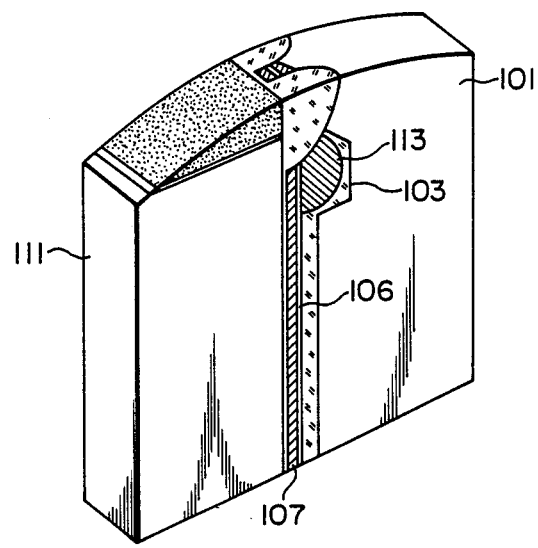
Figure 21:
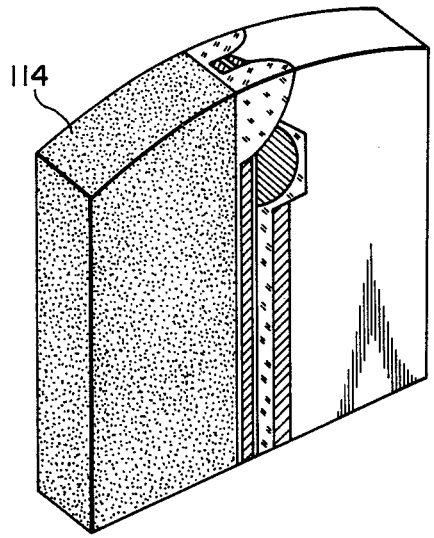

FIGS. 19 to 21 show magnetic heads of other embodiments in each of which a part of the constitution differs from the head of FIG. 16. In FIGS. 19 to 21, the parts and components which are the same as or correspond to those shown in FIGS. 12 to 14 are designated by the same reference numerals. FIG. 19 shows a type in which the gap material 106 is not formed until the side of the lower core portion. FIG. 20 shows a type in which the metal magnetic film 102 is not formed on the side under and below the winding groove 103. Further, FIG. 21 shows a type in which the whole protecting plate is formed by the nonmagnetic material 114.

Figure 22:
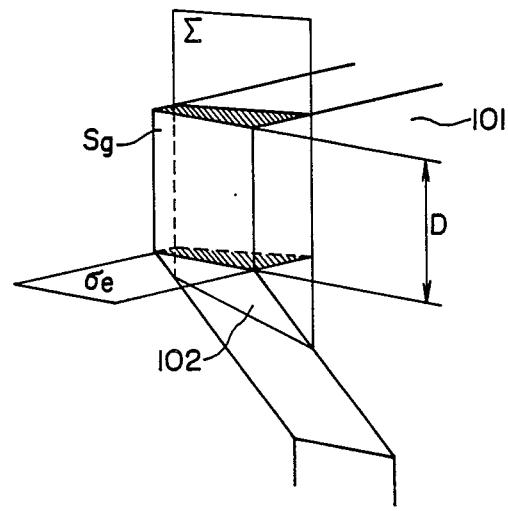
FIG. 22 is a diagram showing a state of a time-dependent change of the magnetic head shown in FIG. 16.

FIG. 22 is a diagram showing the edge portion of the core in the head of each of the foregoing embodiments shown in FIGS. 16 to 21. As shown in FIG. 22, the shape of the first magnetic film on the medium slide surface doesn't change until the surface $\sigma_e$ corresponding to the depth end. Namely, even if the magnetic head is worn away and the depth changes due to the use for a long time, the stable characteristics of the heads of the embodiments can be provided.

According to the magnetic heads of the embodiments, the area of the metal magnetic film which is formed on the material of high permeability such as ferrite or the like of the core half body having the groove for the winding window is reduced as small as possible, and the accumulation of the internal stresses which are caused in the head manufacturing process is decreased. Thus, the peel-off of the metal magnetic film and cracks which may be caused in ferrite and fused and adhered glass are minimized, and the yield in manufacturing of the heads can be improved.

Next, in the P type MIG head as shown in Fig. 9, an embodiment which can further improve the manufacturing yield and the magnetic recording and reproducing characteristics will now be described with reference to FIGS. 23 to 27.

In the head of FIG. 9, on the medium slide surface, the metal magnetic film 102 can be adhered on the ferrite block 101 by only the area as wide as the track width. In particular, the film may be peeled off in the work to determine the track width, so that the mass productivity may also deteriorate.

Figure 23:
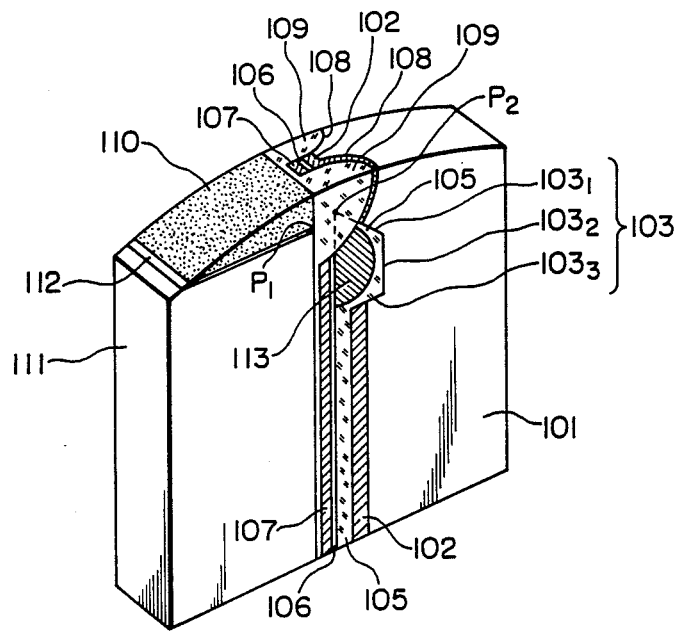
FIG. 23 is a diagram showing a structure of a magnetic head as still another embodiment of the invention.
Figure 24A:
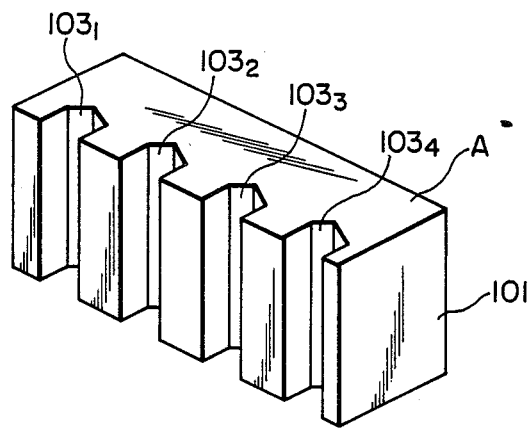
FIGS. 24A to 24G are diagrams showing a manufacturing process of the magnetic head shown in FIG. 23.
Figure 24B:
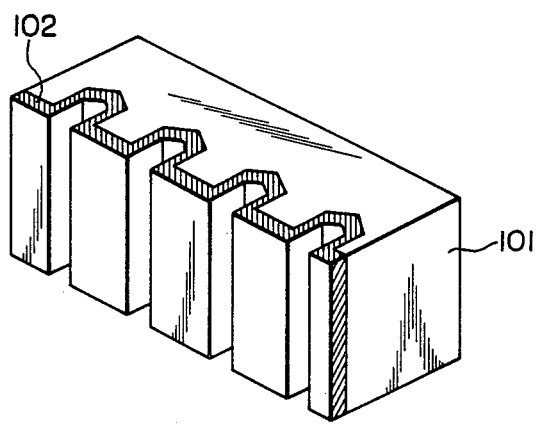
Figure 24C:
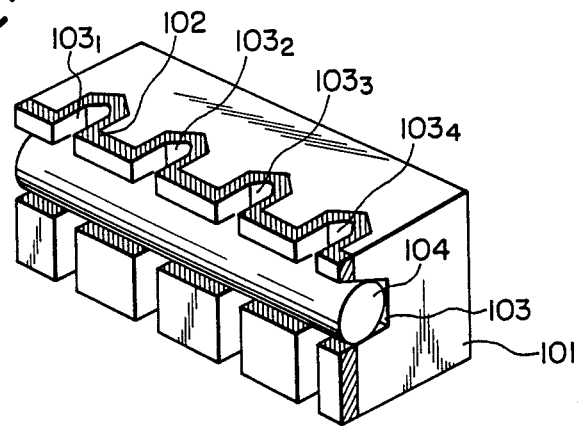
Figure 24D:
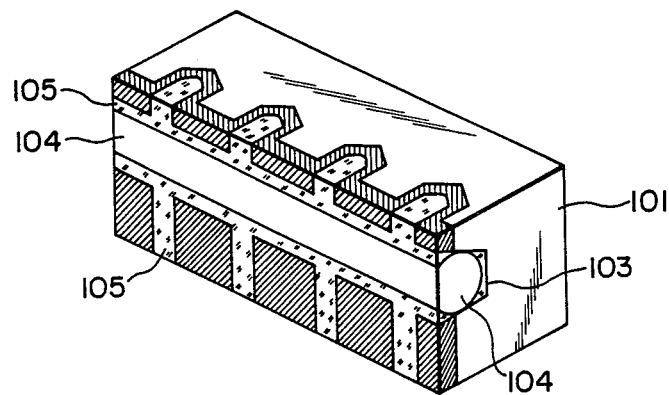
Figure 24E:
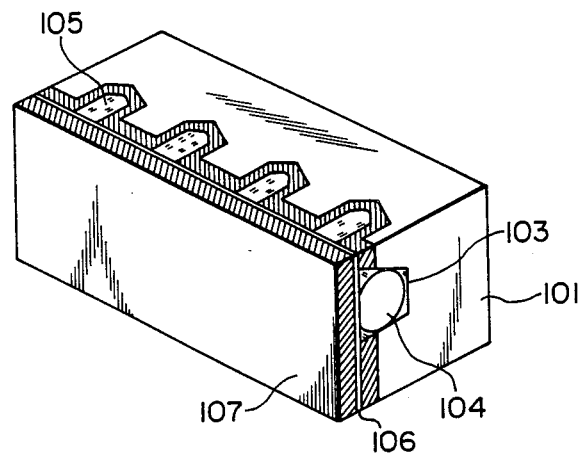
Figure 24F:
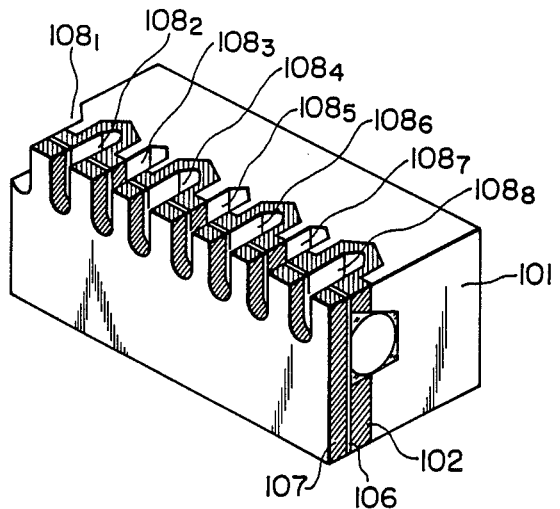
Figure 24G:
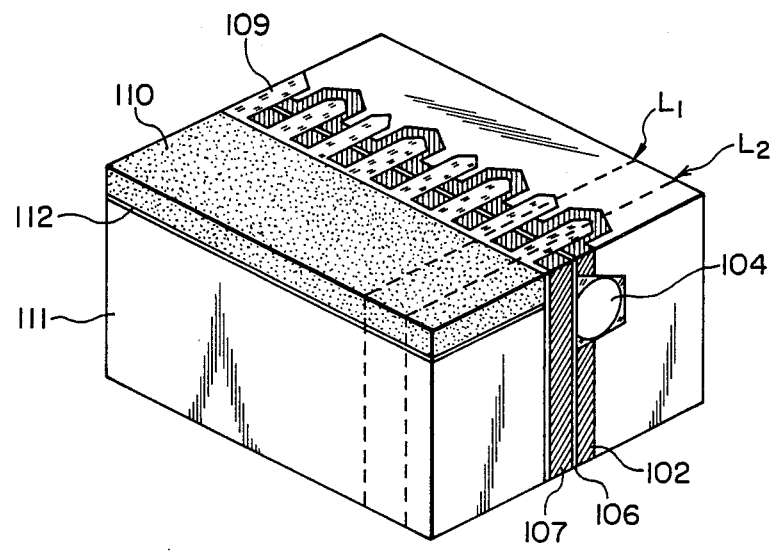

FIG. 23 is a diagram showing an embodiment which can solve the foregoing problems. The most different structural point from the head of FIG. 9 is that the metal magnetic film 102 is extended to one of both side surfaces of the ferrite core 101 which are exposed by digging the groove 108 so that the core edge portion near the gap 106 on the medium slide surface constitutes the almost parallel side surfaces in order to set the accurate track width.

FIGS. 24A to 24G show a manufacturing process of the head of FIG. 23.

Figure 25:
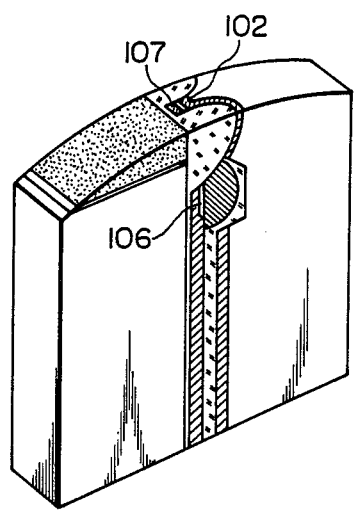
FIGS. 25 to 27 are diagrams showing magnetic heads as other embodiments in each of which a part of the constitution differs from the magnetic head of FIG. 23.
Figure 26:
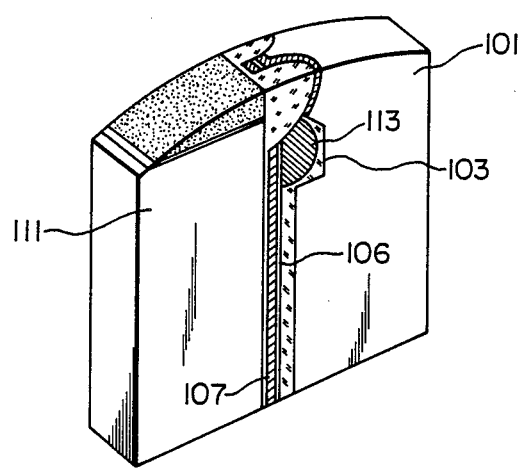
Figure 27:
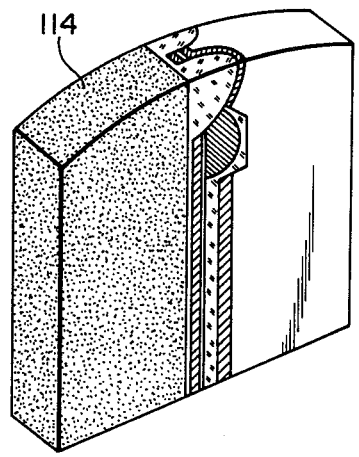

FIGS. 25 to 27 show magnetic heads of embodiments in each of which a part of the constitution differs from that of the head of FIG. 23. In FIGS. 25 to 27, the parts and components similar to those in FIGS. 12 to 14 are designated by the same reference numerals. FIG. 25 shows a type in which the gap material 106 is not formed to the side of the lower core portion. FIG. 26 is a type in which the metal magnetic film 102 is not formed on the portion under and below the winding groove 103. FIG. 27 is a type in which the whole protecting plate is formed by the nonmagnetic material 114.

In FIGS. 23 to 27, the parts and components similar to those shown in FIGS. 9 to 14 are designated by the same reference numerals. In the heads shown in FIGS. 23 to 27, as compared with the heads shown in FIGS. 9 to 14, a wide contact area can be assured on the medium slide surface between the block 101 of the high permeability magnetic material and the magnetic film 102 having a high saturation magnetic flux density, and as shown in FIG. 24F, the peel-off of the film is less likely to occur when the grooves $108_1$ to $108_8$ to determine the track width are formed.

In addition, on the medium slide surface, the magnetic film 102 is extended along the block 101 and glass 109 of a low melting point. Thus, the magnetic resistance is reduced, contour effect is suppressed, and the excellent magnetic characteristics can be attained.

In the similar P type MIG head, other embodiments of the types in which on the medium slide surface, the contact length between the block 101 of the high permeability material and the magnetic film 102 of high saturation magnetic flux density is the longest will now be described with reference to FIGS. 28 to 33.

Figure 28:
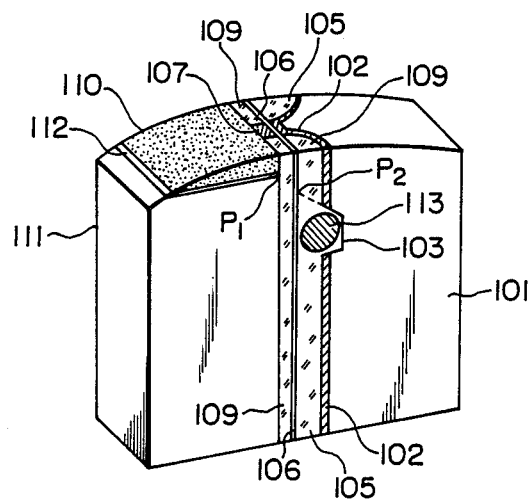
FIG. 28 is a diagram showing a structure of a magnetic head as further another embodiment of the invention.

FIG. 28 is a diagram showing a constitution of a magnetic head of the embodiment as a type in which on the medium slide surface of the P type MIG head, the magnetic film 102 is extended from both ends of the magnetic gap 106 along the block 101. FIGS. 30A to 30F show a manufacturing process of the magnetic head in this embodiment.

Figure 30A:
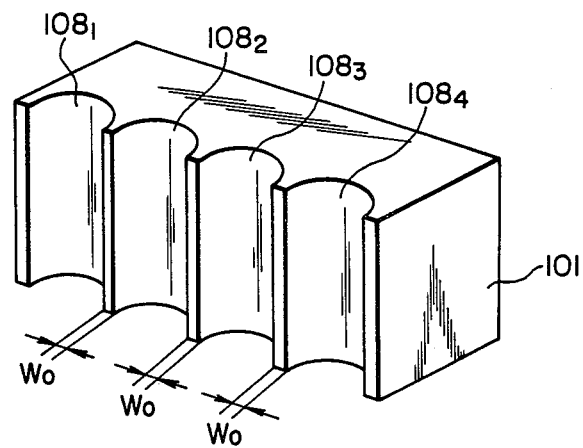
FIGS. 30A to 30F are diagrams showing a manufacturing process of the magnetic head shown in FIG. 28.
Figure 30B:
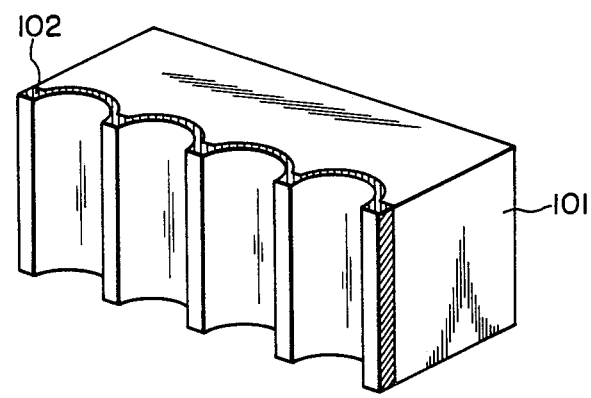
Figure 30C:
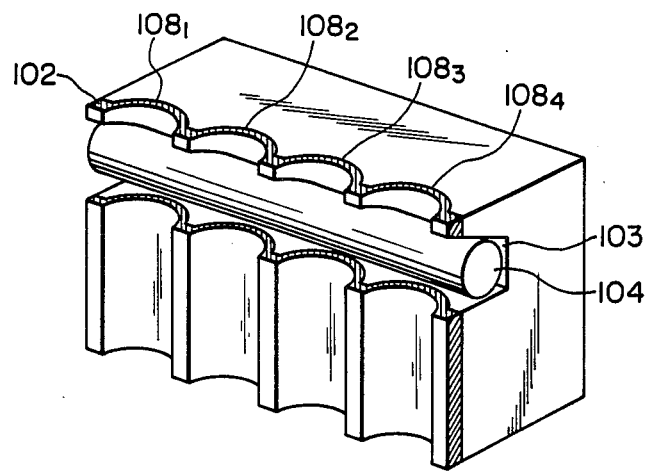
Figure 30D:
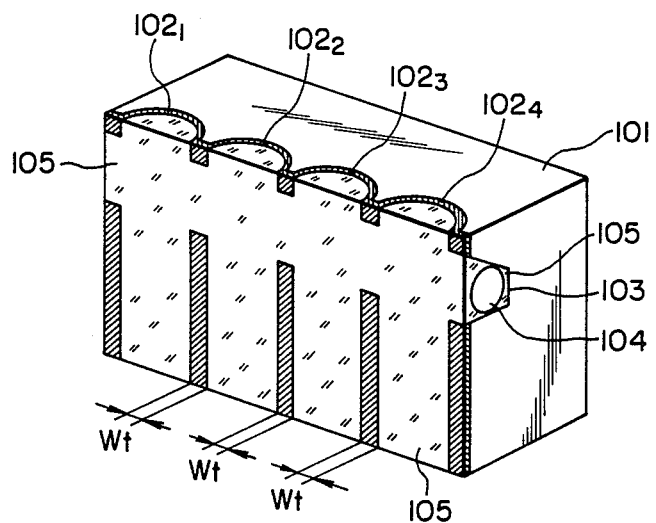
Figure 30E:
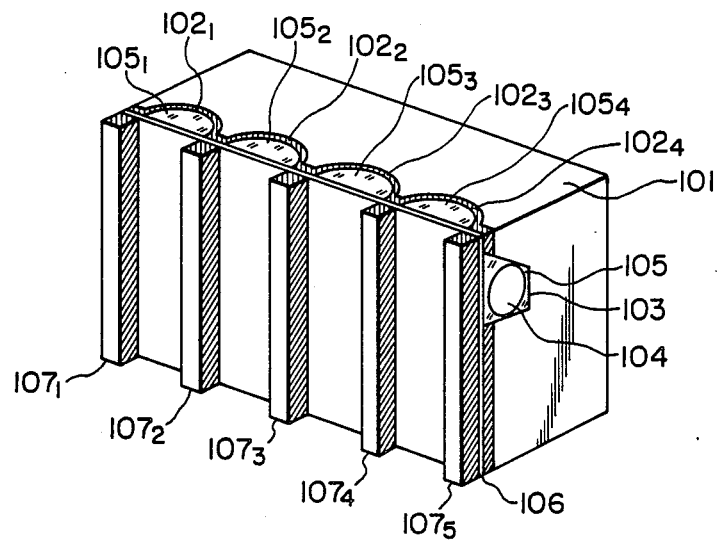
Figure 30F:
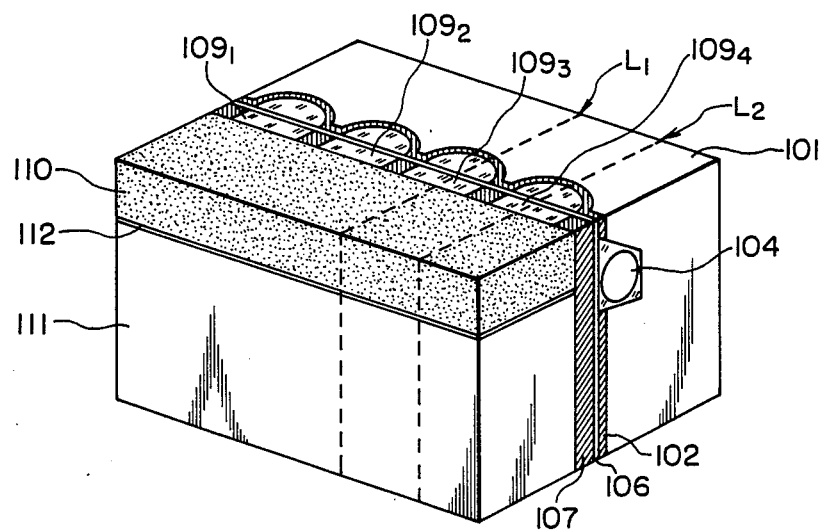

In the manufacturing process shown in FIGS. 30A to 30F, the track width is determined by forming the magnetic film 107 ($107_1$ to $107_5$) in FIG. 30E by the etching process in a manner similar to FIG. 8.

Hitherto, in P type MIG heads, it has been considered that the contour effect occurs since the boundary portion between the material of high permeability and the material of high saturation magnetic flux density functions as the pseudo gap.

However, as the result of that a few prototypes of the magnetic head with the constitution shown in FIG. 28, in which the thicknesses of the magnetic films 102 and 108 were changed, were produced, it has been found that the contour effect decreases from a point that the film thicknesses exceed predetermined values.

Figure 29:
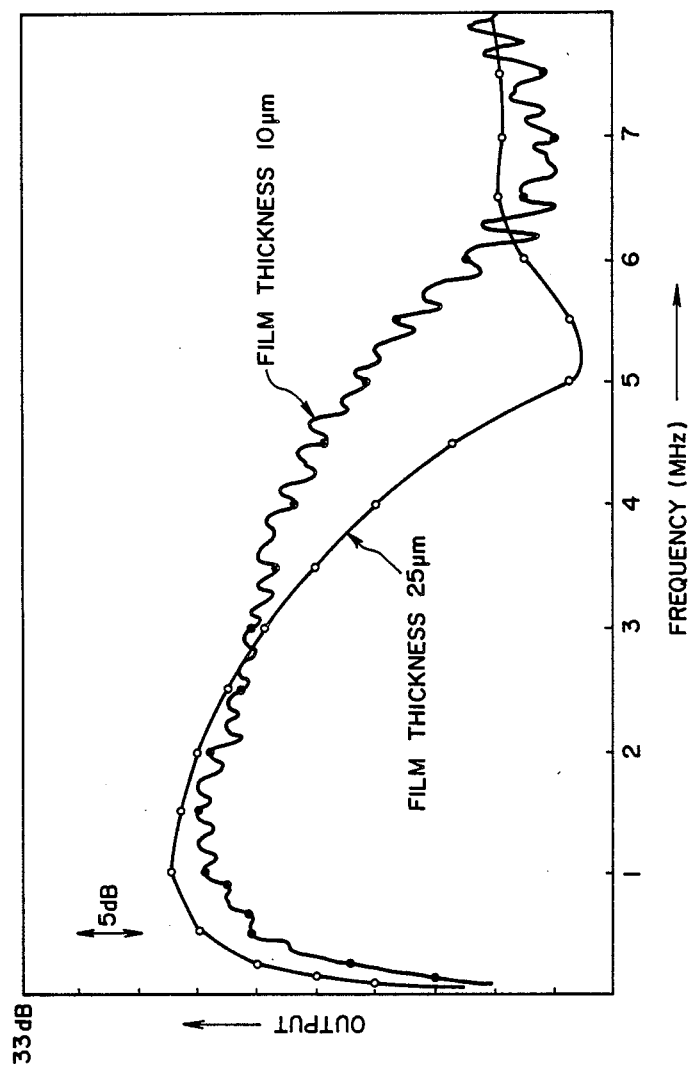
FIG. 29 is a graph showing frequency characteristics of the head shown in FIG. 28.

The experimental data of the heads of the prototypes is shown in FIG. 29. As will be obvious from FIG. 29, when the film thicknesses near the gap 106 are 10 $\mu$m, the ripple output is 3 to 5 dB. On the other hand, when the film thicknesses are 25 $\mu$m, the ripple output is suppressed to about 1 to 2 dB. When the thicknesses of the magnetic films 102 and 108 of high saturation magnetic flux density are different, it has been found that the ripple suppressing effect can be obtained.

Figure 31:
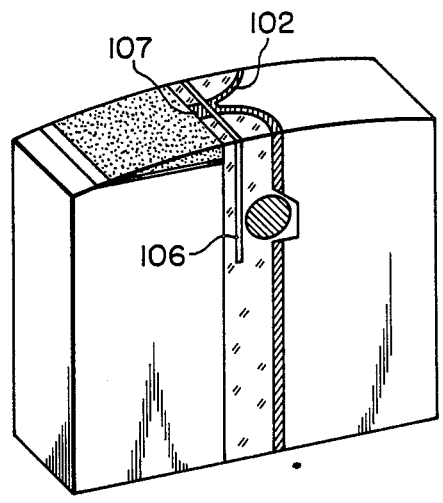
FIGS. 31 to 33 are diagrams showing structures of magnetic heads as other embodiments in each of which a part of the constitution differs from the magnetic head shown in FIG. 28.
Figure 32:
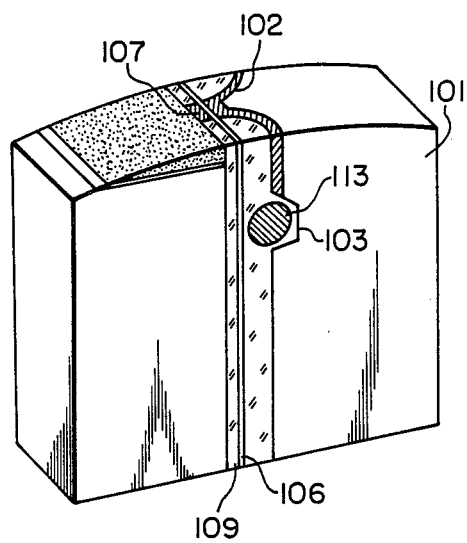
Figure 33:
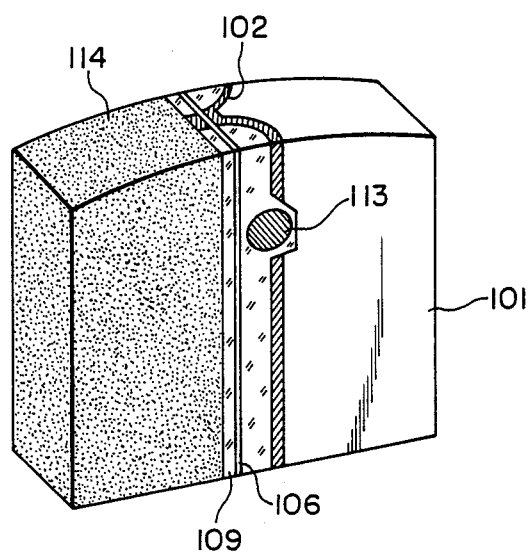

FIGS. 31 to 33 show magnetic heads of embodiments in each of which a part of the constitution differs from the head of FIG. 28. In FIGS. 31 to 33, the parts and components similar to those in FIGS. 12 to 14 are designated by the same reference numerals. FIG. 31 shows a type in which the gap material 106 is not formed to the side of the lower core portion. FIG. 32 is a type in which the metal magnetic film 102 is not formed on the portion under and below the winding groove 103. FIG. 33 is a type in which the whole protecting plate is formed by the nonmagnetic material 114.

In these heads as well, when the film thicknesses near the gap 106 exceed 20 $\mu$m, the ripple of the frequency to output characteristics falls within a range of 1 to 2 dB. Consequently, no problem will occur in practical use of the head.

Next, in the A type MIG head, when considering the case where on the medium slide surface, the contact length between the block 101 and the magnetic film 102 is similarly extended, the constitution shown in FIG. 6 is considered as a constitution of the medium slide surface. However, to form the slide surface as shown in FIG. 6, a fairly high accuracy is required in working.

FIGS. 34A and 34B are diagrams for explaining problems in association with the deterioration in working accuracy of the magnetic head shown in FIG. 6. FIG. 34A is a diagram when the head shown in FIG. 6 was seen from the side of the slide surface of the magnetic recording medium. In the diagram, $t_w$ indicates a track width of the head. In such a type of head, if it is desired to determine the track width $t_w$ with high degrees of accuracy and efficiency, after the magnetic film 107 was formed, it is necessary to feed, for example, a high-accurate dicer at the pitch corresponding to a desired track width $t_w$ and to work in the direction indicated by an arrow A in FIG. 34A until the depth indicated by a broken line B in FIG. 34A by the dicer. However, when performing such a work, errors of working depth are often caused. For example, there is the case where the work is performed until the depth indicated by, for example, a broken line B' in FIG. 34A. FIG. 34B is a diagram showing a magnetic head which is derived in the case where such a working error occurred when it was seen from the side of the medium slide surface.

As shown in FIG. 34B, a discontinuous portion is produced in the magnetic film 107 in association with the working error, so that the magnetic resistance of the core increases by the existence of the discontinuous portion, causing the magnetic recording/reproducing characteristics to deteriorate.

Another embodiment which can improve the foregoing point is shown in FIG. 35. In the head shown in FIG. 35 as well, the metal magnetic film is removed as much as possible from the wall surfaces $103_1$, $103_2$, and $103_3$ which form the groove 103 to form the winding window 113. Further, on the slide surface, the groove 108 is formed in the core edge portion near the gap 107 so as to constitute the almost parallel side surfaces in order to set the accurate track width. However, the metal magnetic material is formed on either one of both side surfaces of the ferrite core 101, which will be exposed by digging the groove.

FIGS. 36A to 36H show a manufacturing process of the head having such a structural feature.

Figure 36E:
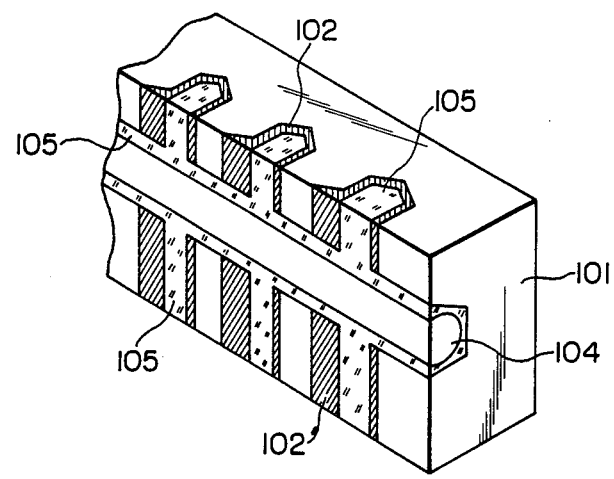
Figure 36F:
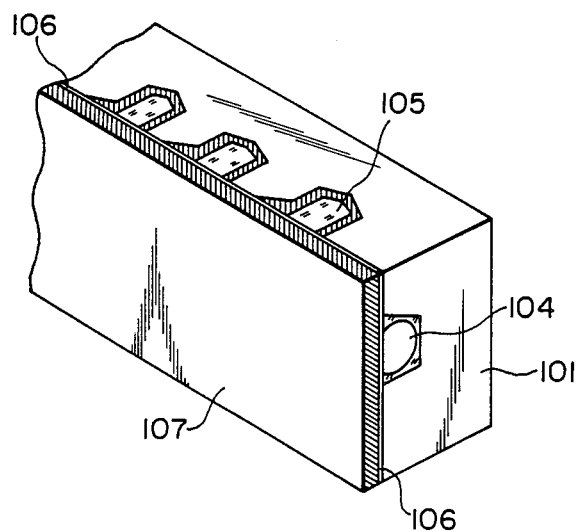

The manufacturing process shown in FIGS. 36A to 36H is substantially similar to that in each of the foregoing embodiment excluding a different point that the groove 108 which is formed in the ferrite block 101 and serves to determine the track width is formed by three steps as illustrated in FIGS. 36A, 36B, and 36E.

FIGS. 37A to 37E show constitutions on the medium slide surface in other embodiments similar to FIG. 35. Each of the embodiments has the following common constitution: namely, (1) the boundary between the metal magnetic film 102 and the block 101 of the high permeability material is not parallel with the gap 106; (2) the boundary line of the core edge portion to restrict the gap length, accordingly, the track width is almost parallel; and (3) the metal magnetic film is extended to one of the boundaries between the block 101 and the glass 109 corresponding to both side surfaces of the groove which are exposed by digging third grooves $108_1''$ to $108_3''$.

Figure 38:
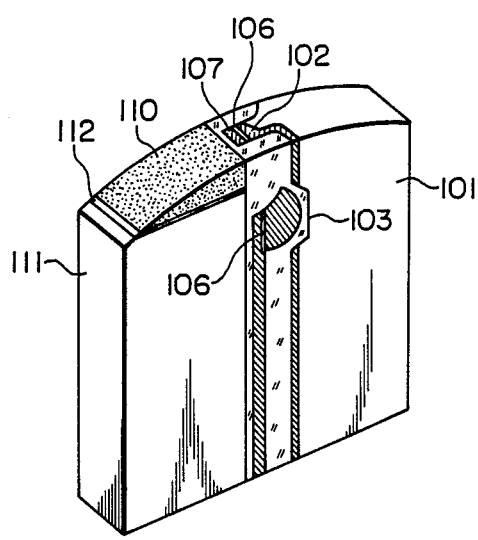
FIGS. 38 to 40 are diagrams showing structures of magnetic heads as other embodiments in each of which a part of the constitution differs from the magnetic head of FIG. 35.
Figure 39:
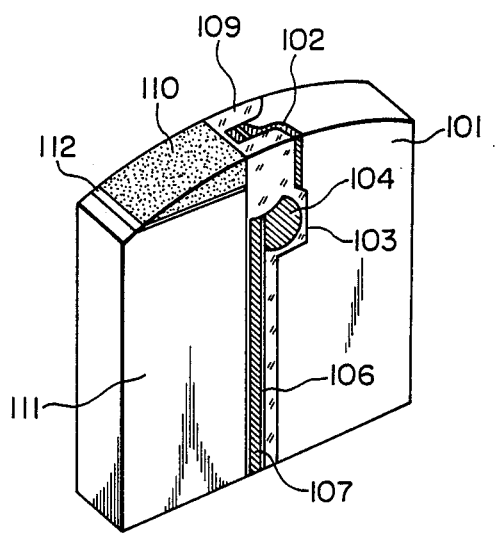
Figure 40:
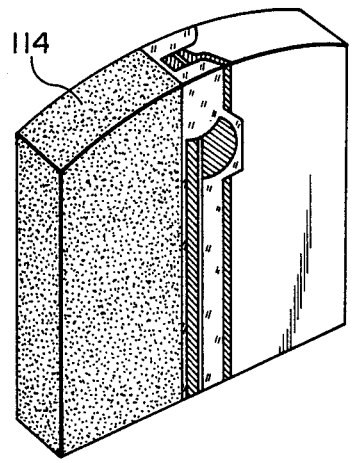

FIGS. 38 to 40 show magnetic heads of embodiments in each of which a part of the constitution differs from the head of FIG. 35. In FIGS. 38 to 40, the parts and components similar to those shown in FIGS. 12 to 14 are designated by the same reference numerals. FIG. 38 shows a type in which the gap material 106 is not formed until the side of the lower core portion. FIG. 39 shows a type in which the metal magnetic film 102 is not formed on the portion under and below the winding groove 103. FIG. 40 shows a type in which the whole protecting plate is formed by the nonmagnetic material 114.

Figure 36G:
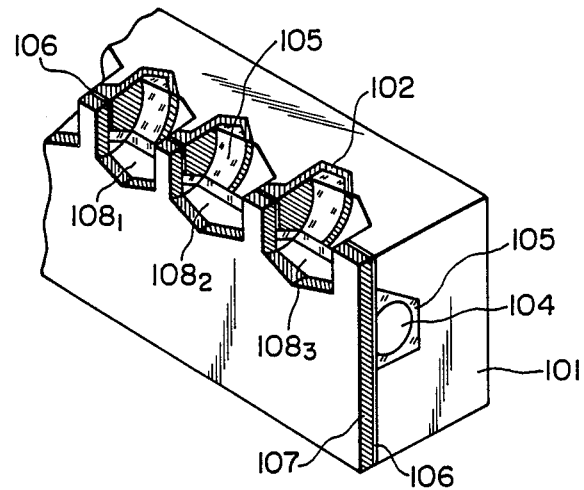
Figure 36H:
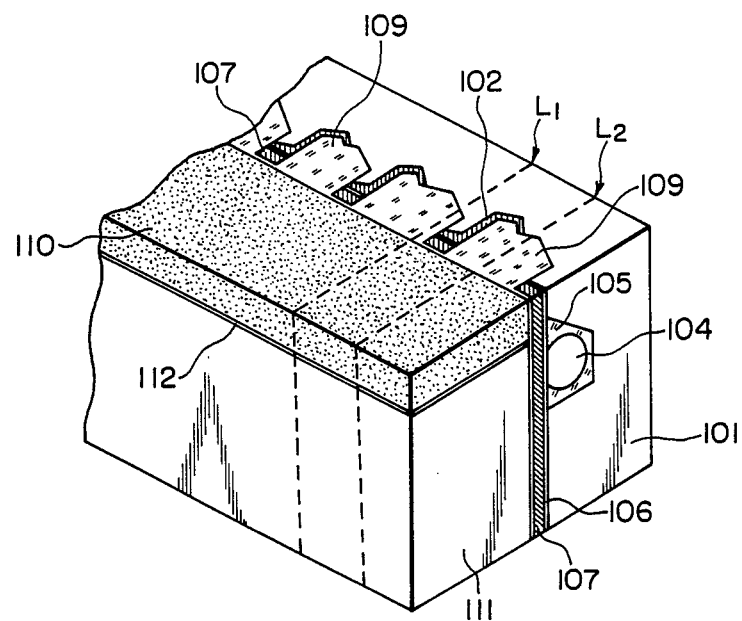
Figure 37A:
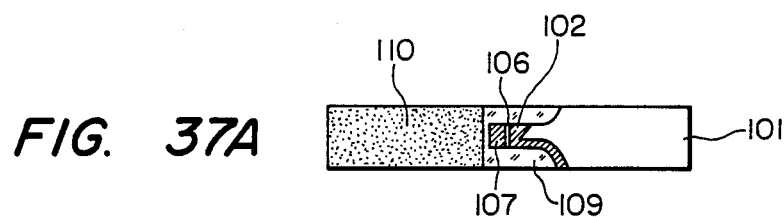
FIGS. 37A to 37E are diagrams showing constitutions on the medium slide surfaces of magnetic heads as other embodiments similar to the magnetic head of FIG. 35.
Figure 37B:
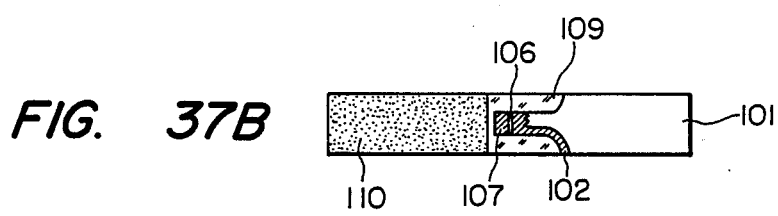
Figure 37C:
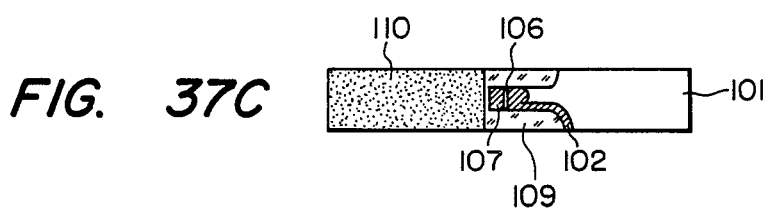
Figure 37D:
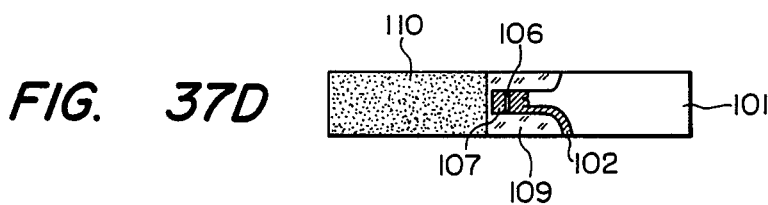
Figure 37E:
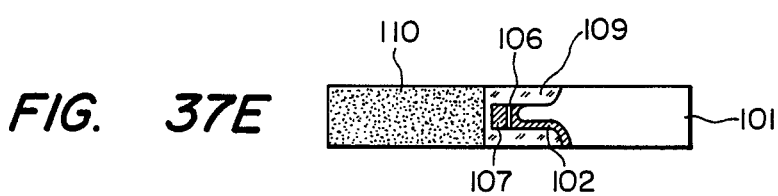

In the magnetic head as shown in FIGS. 35 and 38 to 40, as shown in FIGS. 36B and 36G, on the medium slide surface, grooves $108_1'$ to $108_3'$ toform the magnetic film 102 and the grooves $108_1''$ to $108_3''$ to determine the track width are all formed perpendicular to the groove forming surface of the block 101. Therefore, if the grooves $108_1''$ to $108_3''$ are formed shallower than the grooves $108_1'$ to $108_3'$, no discontinuous portion will be produced in the magnetic film 102 even if the working accuracy deteriorates when the grooves $108_1''$ to $108_3''$ are formed.

Finally, an explanation will now be made with respect to a magnetic head of an embodiment of a type in which on the medium slide surface of the A type MIG head, the magnetic film 102 is extended from both ends of the magnetic gap 106 along the block 101.

Figure 41:
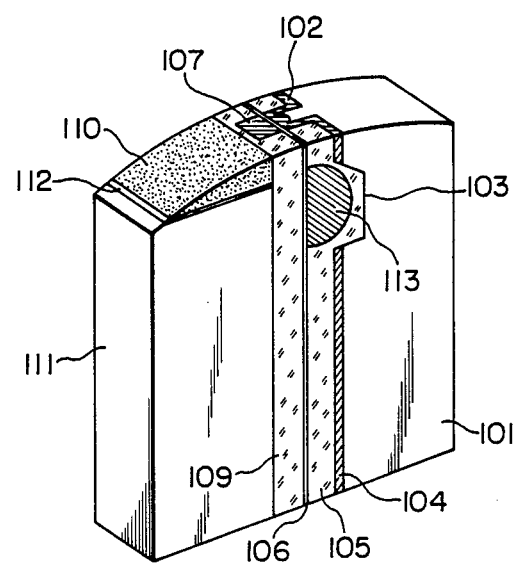
FIG. 41 is a diagram showing a structure of a magnetic head as yet another embodiment of the invention.

FIG. 41 is a diagram showing the embodiment of this type of magnetic head, in which the parts and components similar to those shown in FIG. 28 are designated by the same reference numerals. FIGS. 42A to 42F are diagrams showing a manufacturing process of the magnetic head of FIG. 41.

Figure 42A:
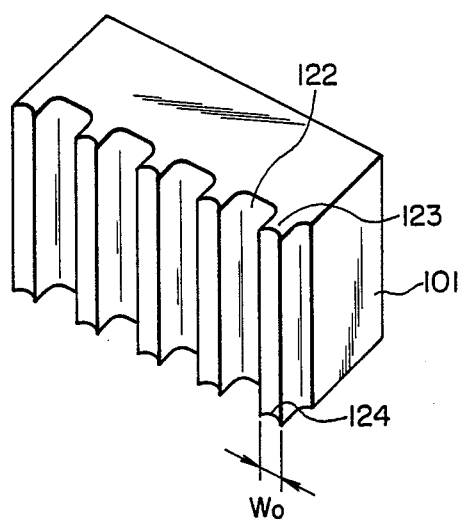
FIGS. 42A to 42F are diagrams showing a manufacturing process of the magnetic head shown in FIG. 41.

First, as shown in FIG. 42A, a plurality of grooves 122 are formed at the edge portions of the rectangular parallelepiped block 101 of monocrystalline ferrite or the like by a mechanical work such as a peripheral slicer or the like. The grooves 122 are formed such that the width (indicated by $W_O$ in FIG. 42A) of the tip of a projection 123 which is formed in the respective grooves is narrower than the track width. A groove 124 is formed in the edge surface of each projection 123 by the mechanical work. The groove 124 is formed so that the boundary surface with the metal magnetic film which will be later adhered on the groove 124 is not parallel with the magnetic gap.

Figure 42B:
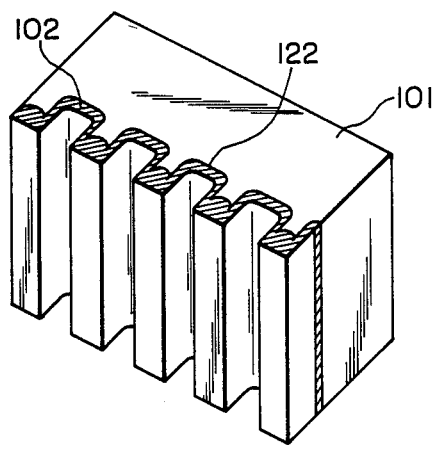
Figure 42C:
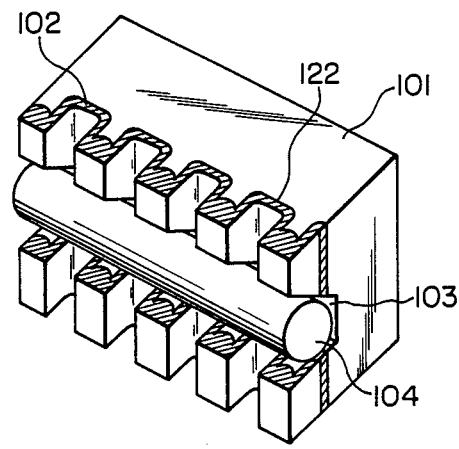
Figure 42D:
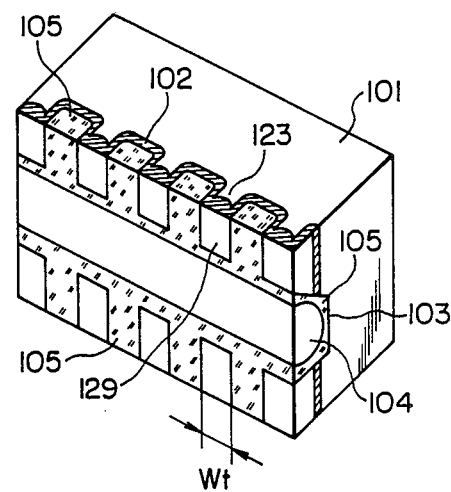

Next, as shown in FIG. 42B, the metal magnetic film 102 is adhered on the surface of the ferrite block 101 in which the grooves 122 and 124 are formed by the thin film forming technique such as physical evaporation deposition, plating, CVD, or the like. After the film 102 was formed, as shown in FIG. 42C, the groove 103 for winding is formed and the thin wire 104 of aluminum or the like is inserted into the groove 103. Further, as shown in FIG. 42D, the grooves 122 on which the metal magnetic film 102 was formed are filled with the glass 105 of a low melting point. A gap forming surface 129 is obtained by polishing the surface filled with the glass 105 so as to become a mirror surface.

Figure 42E:
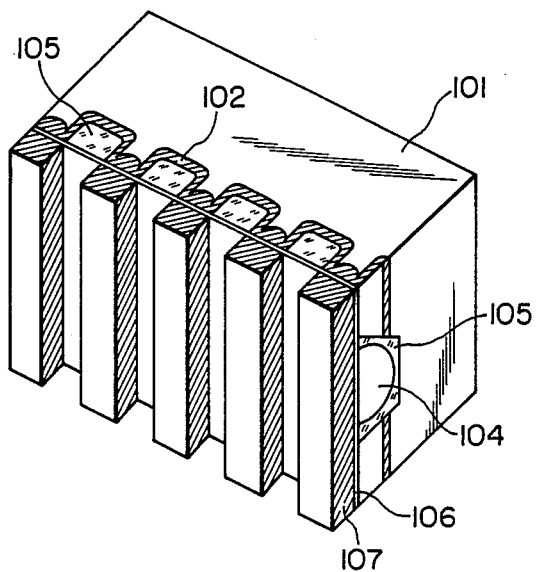
Figure 42F:
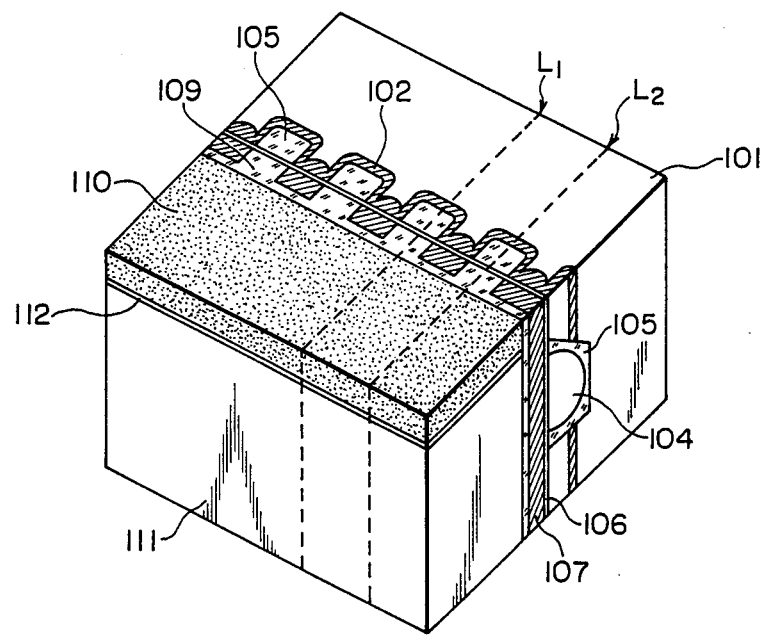
Figure 43A:
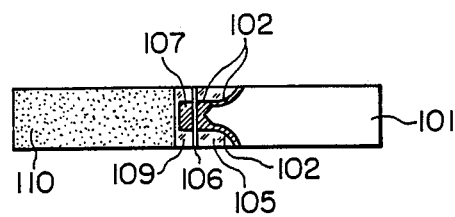
FIGS. 43A to 43G are diagrams showing constitutions on the medium slide surfaces of magnetic heads as other embodiments similar to the magnetic head shown in FIG. 41.
Figure 43B:
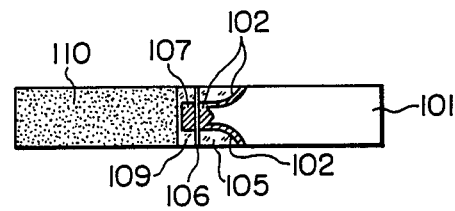
Figure 43C:
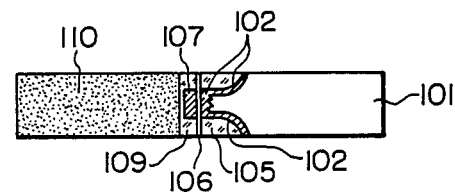
Figure 43D:
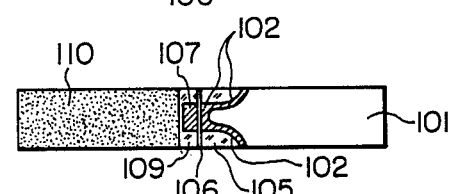
Figure 43E:
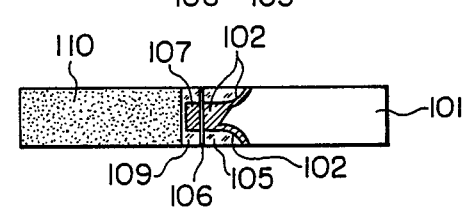
Figure 43F:
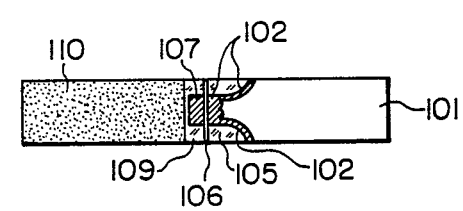
Figure 43G:
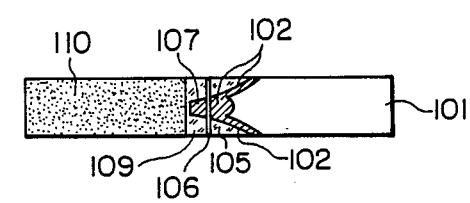
Figure 44:
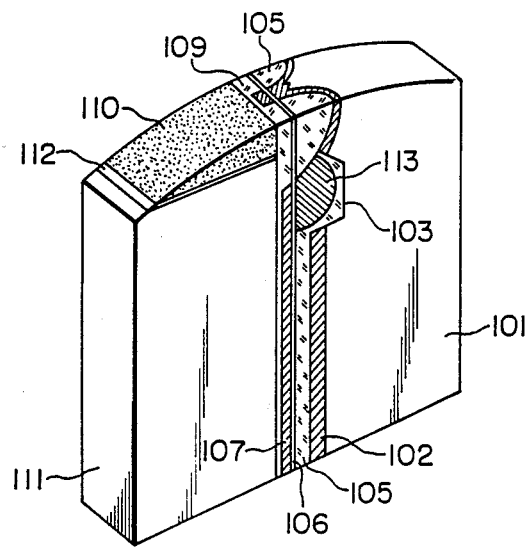
FIGS. 44 to 47 are diagrams showing structures of magnetic heads as other embodiments in each of which a part of the constitution differs from the magnetic head of FIG. 41.

Next, the gap material 106 such as $SiO_2$ or the like is formed as a film on the gap forming surface 129 by the thin film forming technique. As shown in FIG. 42E, the metal magnetic film 107 is formed on the gap material 106 at the positions which accurately face the metal magnetic film 102. The film 107 is formed by the thin film forming technique such as metal mask method, photolithography method, or the like, or by the mechanical work. The subsequent processes are substantially the same as those in each of the foregoing embodiments.

FIGS. 43A to 43G sow constitutions on the medium slide surface of other embodiments of the present invention similar to FIG. 41. Each of these embodiments has the following common constitution: namely, (1) the boundary between the metal magnetic film 102 and the block 101 is not parallel with the gap 106; (2) the boundary line of the core edge portion to restrict the gap length, accordingly, the track width is almost parallel; and (3) the metal magnetic film 102 is extended to both side surfaces of the block 101 along the boundary between the block 101 and the glass 105.

Figure 45:
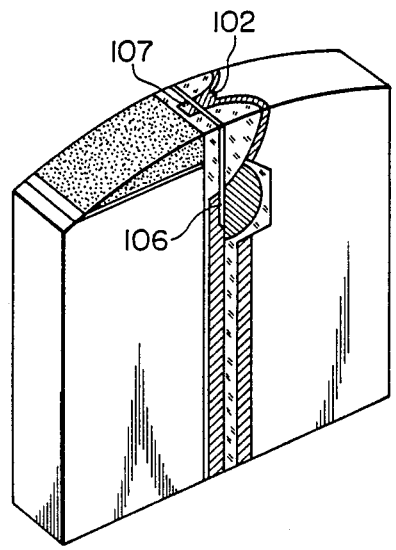
Figure 46:
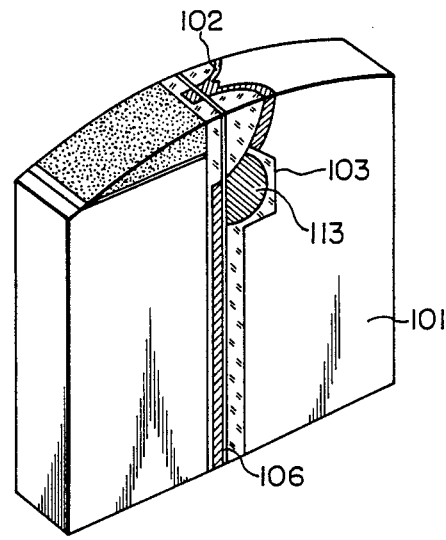
Figure 47:
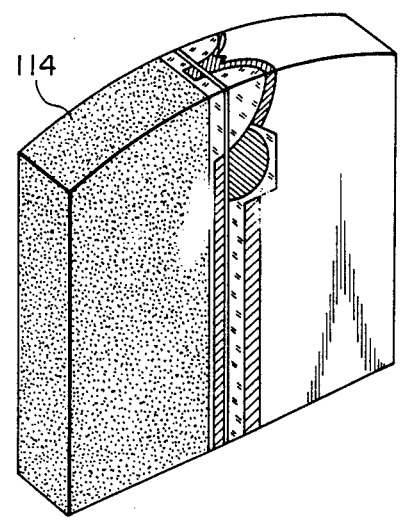

FIGS. 45 to 47 show magnetic heads of other embodiments in each of which a part of the constitution differs from the head of FIG. 41. In FIGS. 45 to 47, the parts and components similar to those shown in FIGS. 12 to 14 are designated by the same reference numerals. FIG. 45 shows a type in which the gap material 106 is not formed until the side of the lower core portion. FIG. 46 shows a type in which the metal magnetic film 102 is not formed on the portion under and below the winding groove 103. FIG. 47 shows a type in which the whole protecting plate is formed by the nonmagnetic material 114.

In the magnetic heads of the embodiments shown in FIGS. 41 to 47, as compared with the P type MIG heads shown in FIGS. 16 to 21, on the medium slide surface, the long length of the boundary line between the metal magnetic film and the material of high permeability can be obtained, so that the influence on the magnetic recording/reproducing characteristics by the boundary can be reduced and the excellent magnetic recording/reproducing characteristics can be derived.

What we claim is:

1. A manufacturing method of a magnetic head core, comprising:
   (a) a first step of forming a groove for a winding in one surface of a magnetic block which is made of a first magnetic material of high permeability;
   (b) a second step of depositing a first magnetic film made of a second magnetic material of high saturation magnetic flux density on the surface of the magnetic block on which the groove is formed;

(c) a third step of depositing a nonmagnetic film made of a nonmagnetic material for serving as a magnetic gap on the first magnetic film deposited on the surface of the magnetic block;

(d) a fourth step of depositing a second magnetic film made of the second magnetic material on the nonmagnetic film deposited on the first magnetic film;

(e) a fifth step of bonding a reinforcing block with the second magnetic film deposited on the nonmagnetic film, the reinforcing block including a nonmagnetic exposure portion, and said fifth step follows said fourth step; and (f) a sixth step of forming a magnetic head core which includes the magnetic block, the first magnetic film, the nonmagnetic film, the second magnetic film and the reinforcing block, so that the nonmagnetic exposure portion exposes to a sliding face for sliding a recording medium of the magnetic head core.

2. A method according to claim 1, wherein the magnetic block consists of an oxide magnetic material.

3. A method according to claim 1, wherein both of the first and second magnetic films are made of magnetic alloy.

4. A method according to claim 1, wherein the reinforcing block includes a first portion formed from a nonmagnetic material and a second portion formed from a magnetic material, and the first portion is arranged on a side of the sliding surface and the second portion is arranged on another side of the sliding surface.

5. A method according to claim 1, wherein the reinforcing block is formed from only a nonmagnetic material.

6. A method according to claim 1, wherein the first magnetic film is deposited on only an adjacent portion to the sliding surface on the surface of the magnetic block where the groove is formed.

7. A method according to claim 1, wherein the first magnetic film is deposited on a portion excluding the inside of the groove on the surface of the magnetic block where the groove is formed.

8. A method according to claim 1, wherein the first magnetic film is deposited on the whole surface of the magnetic block where the groove is formed.

9. A method according to claim 1, wherein on the sliding surface, at least a part of the boundary between the magnetic block and the first magnetic film is parallel with the nonmagnetic film.

10. A method according to claim 9, wherein the thickness of the first and second magnetic films differ.

11. A manufacturing method of a magnetic head core, comprising:

(a) a first step of forming a first surface on a magnetic block which is made of a first magnetic material of high permeability;

(b) a second step of depositing a first magnetic film made of a second magnetic material of high saturation magnetic flux density on the first surface;

(c) a third step of forming a second surface arranged to be oblique to the first surface on the first magnetic film;

(d) a fourth step of depositing a nonmagnetic film made of a nonmagnetic material for serving as a magnetic gap on the second surface;

(e) a fifth step of depositing a second magnetic film made of the second magnetic material on the nonmagnetic film deposited on the second surface;

(f) a sixth step of bonding a reinforcing block with the second magnetic film deposited on the nonmagnetic film, the reinforcing block including a nonmagnetic exposure portion, and said sixth step follows said fifth step; and (g) a seventh step of forming a magnetic head core which includes the magnetic block, the first magnetic film, the nonmagnetic film, the second magnetic film and the reinforcing block, so that the nonmagnetic exposure portion exposes to a sliding surface for sliding a recording medium of the magnetic head core.

12. A method according to claim 11, wherein on the sliding surface, the first and second surfaces are straight lines which are not parallel with each other.

13. A method according to claim 11, wherein on the sliding surface, the first surface is a curve and the second surface is a straight line.

14. A manufacturing method of a magnetic head core, comprising;

(a) a first step of forming a groove for winding in one surface of a magnetic block which is made of a first magnetic material of high permeability;

(b) a second step of depositing a first magnetic film made of a second magnetic material of high saturation magnetic flux density on a portion excluding the inside of the groove on the surface of the magnetic block where the groove is formed;

(c) a third step of depositing a nonmagnetic film made of a nonmagnetic material for serving as a magnetic gap on the first magnetic film deposited on the surface of the magnetic block;

(d) a fourth step of depositing a second magnetic film made of the second magnetic material on the nonmagnetic film deposited on the first magnetic film;

(e) a fifth step of bonding a reinforcing block with the second magnetic film deposited on the nonmagnetic film, the reinforcing block including a nonmagnetic exposure portion, and said fifth step follows said fourth step; and (f) a sixth step of forming a magnetic head core which includes the magnetic block, the first magnetic film, the nonmagnetic film, the second magnetic film and the reinforcing block, so that the nonmagnetic exposure portion exposes to a sliding surface for sliding a recording medium of said magnetic head core.

15. A method according to claim 14, wherein on the sliding surface, at least a part of the boundary between the magnetic block and the first magnetic film is parallel with the nonmagnetic film.

16. A method according to claim 15, wherein the thickness of the first and second magnetic films differ.

17. A method according to claim 14, wherein on the sliding surface, the boundary between the first magnetic film and the magnetic block is oblique to the nonmagnetic film.

* * * * *